(12) United States Patent
Wagner

(10) Patent No.: US 6,850,996 B2
(45) Date of Patent: *Feb. 1, 2005

(54) SYSTEM AND METHOD FOR ENABLING TRANSACTIONS BETWEEN A WEB SERVER AND AN AUTOMATED TELLER MACHINE OVER THE INTERNET

(75) Inventor: Richard Hiers Wagner, Dunwoody, GA (US)

(73) Assignee: Datascape, Inc., Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/614,398

(22) Filed: Jul. 7, 2003

(65) Prior Publication Data

US 2004/0006657 A1 Jan. 8, 2004

Related U.S. Application Data

(63) Continuation of application No. 10/213,959, filed on Aug. 7, 2002, now Pat. No. 6,684,269, which is a continuation of application No. 10/100,347, filed on Mar. 18, 2002, now Pat. No. 6,694,387, which is a continuation of application No. 09/907,076, filed on Jul. 17, 2001, now Pat. No. 6,745,259, which is a continuation of application No. 09/314,266, filed on May 18, 1999, now Pat. No. 6,366,967, which is a continuation of application No. 08/995,123, filed on Dec. 19, 1997, now Pat. No. 5,905,908, which is a continuation of application No. 08/493,772, filed on Jun. 22, 1995, now Pat. No. 5,742,845.

(51) Int. Cl.[7] .............................................. G06F 13/14

(52) U.S. Cl. ............................ 710/33; 710/11; 710/20; 709/203; 709/227; 713/200; 713/201; 705/64; 705/70

(58) Field of Search .............................. 710/33, 11, 20; 709/203, 227; 705/64, 70; 713/200, 201; 235/379

(56) References Cited

U.S. PATENT DOCUMENTS

| | | |
|---|---|---|
| 3,668,653 A | 6/1972 | Fair et al. |
| 4,410,962 A | 10/1983 | Daniels et al. |
| 4,438,511 A | 3/1984 | Baran |
| 4,577,152 A | 3/1986 | Macovski |
| 4,620,153 A | 10/1986 | Hino |
| 4,625,171 A | 11/1986 | Sekihara et al. |
| 4,625,276 A | 11/1986 | Benton et al. |
| 4,707,592 A | 11/1987 | Ware |
| 4,724,521 A | 2/1988 | Carron et al. |
| RE32,701 E | 6/1988 | Moran |
| 4,755,940 A | 7/1988 | Brachtl et al. |
| 4,774,655 A | 9/1988 | Kollin et al. |
| 4,787,035 A | 11/1988 | Bourne |
| 4,799,156 A | 1/1989 | Shavit et al. |

(List continued on next page.)

FOREIGN PATENT DOCUMENTS

| | | |
|---|---|---|
| WO | WO 95/16971 | 6/1995 |
| WO | WO 96/41286 | 12/1996 |
| WO | WO 97/01137 | 1/1997 |

OTHER PUBLICATIONS

Geoffrey M. Voelker and Brian N. Bershad—"Mobisaic: An Information System for a Mobile Computing Environment"; Sep. 19, 1994; available online at http://www.cs.ucsd.edu/users/voelker/pubs/mobisaic–MCSA94.pdf.

(List continued on next page.)

Primary Examiner—Rehana Perveen
(74) Attorney, Agent, or Firm—Maginot Moore & Beck

(57) ABSTRACT

An automated teller machine (ATM) implements financial transactions over the Internet. The ATM includes a computer and at least one non-standard I/O device coupled to the computer. The computer of the ATM interprets extended open network protocol statements to control the non-standard I/O device for purposes of implementing a financial transaction.

20 Claims, 25 Drawing Sheets

U.S. PATENT DOCUMENTS

| | | |
|---|---|---|
| 4,815,029 A | 3/1989 | Barker et al. |
| 4,847,604 A | 7/1989 | Doyle et al. |
| 4,885,777 A | 12/1989 | Takaragi et al. |
| 4,901,223 A | 2/1990 | Rhyne |
| 4,912,303 A | 3/1990 | Danielson et al. |
| 4,926,325 A | 5/1990 | Benton et al. |
| 4,942,532 A | 7/1990 | Mori |
| 4,942,552 A | 7/1990 | Merrill et al. |
| 4,947,028 A | 8/1990 | Gorog |
| 4,949,248 A | 8/1990 | Caro |
| 4,962,531 A | 10/1990 | Sipman et al. |
| 4,965,742 A | 10/1990 | Skeirik |
| 4,972,463 A | 11/1990 | Danielson et al. |
| 5,014,221 A | 5/1991 | Mogul |
| 5,018,196 A | 5/1991 | Takaragi et al. |
| 5,021,949 A | 6/1991 | Morten et al. |
| 5,025,373 A | 6/1991 | Keyser, Jr. et al. |
| 5,036,461 A | 7/1991 | Elliot et al. |
| 5,036,484 A | 7/1991 | McCoy et al. |
| 5,046,094 A | 9/1991 | Kawamura et al. |
| 5,047,923 A | 9/1991 | Elstner et al. |
| 5,083,262 A | 1/1992 | Haff, Jr. |
| 5,103,478 A | 4/1992 | Matyas et al. |
| 5,113,517 A | 5/1992 | Beard et al. |
| 5,119,465 A | 6/1992 | Jack et al. |
| 5,146,499 A | 9/1992 | Geffrotin |
| 5,146,553 A | 9/1992 | Noguchi et al. |
| 5,148,481 A | 9/1992 | Abraham et al. |
| 5,149,945 A | 9/1992 | Johnson et al. |
| 5,161,222 A | 11/1992 | Monteio et al. |
| 5,179,690 A | 1/1993 | Ishikawa |
| 5,195,130 A | 3/1993 | Weiss et al. |
| 5,202,828 A | 4/1993 | Vertelney et al. |
| 5,204,947 A | 4/1993 | Bernstein et al. |
| 5,206,951 A | 4/1993 | Khoyi et al. |
| 5,212,369 A | 5/1993 | Karlisch et al. |
| 5,220,380 A | 6/1993 | Hirata et al. |
| 5,220,501 A | 6/1993 | Lawlor et al. |
| 5,239,662 A | 8/1993 | Danielson et al. |
| 5,243,284 A | 9/1993 | Noll |
| 5,256,863 A | 10/1993 | Ferguson et al. |
| 5,272,754 A | 12/1993 | Boerbert |
| 5,274,821 A | 12/1993 | Rouquie |
| 5,276,312 A | 1/1994 | McCarthy |
| 5,277,192 A | 1/1994 | Cumoulin |
| 5,278,955 A | 1/1994 | Forte et al. |
| 5,278,972 A | 1/1994 | Baker et al. |
| 5,294,782 A | 3/1994 | Kumar |
| 5,297,249 A | 3/1994 | Bernstein et al. |
| 5,307,411 A | 4/1994 | Anvret et al. |
| 5,307,499 A | 4/1994 | Yin |
| 5,309,351 A | 5/1994 | McCain et al. |
| 5,321,806 A | 6/1994 | Meinerth et al. |
| 5,321,808 A | 6/1994 | Rupp |
| 5,347,580 A | 9/1994 | Molva et al. |
| 5,347,632 A | 9/1994 | Filepp et al. |
| 5,349,678 A | 9/1994 | Morris et al. |
| 5,351,296 A | 9/1994 | Sullivan |
| 5,367,572 A | 11/1994 | Weiss |
| 5,367,635 A | 11/1994 | Bauer et al. |
| 5,373,561 A | 12/1994 | Haber et al. |
| 5,377,191 A | 12/1994 | Farrell et al. |
| 5,379,344 A | 1/1995 | Larsson et al. |
| 5,386,517 A | 1/1995 | Sheth et al. |
| 5,390,314 A | 2/1995 | Swanson |
| 5,418,908 A | 5/1995 | Keller et al. |
| 5,446,736 A | 8/1995 | Gleeson et al. |
| 5,461,217 A | 10/1995 | Claus |
| 5,475,585 A | 12/1995 | Bush |
| 5,475,858 A | 12/1995 | Gupta et al. |
| 5,497,487 A | 3/1996 | Fortier |
| 5,499,343 A | 3/1996 | Pettus |
| 5,510,710 A | 4/1996 | Nauerth |
| 5,511,122 A | 4/1996 | Atkinson |
| 5,517,569 A | 5/1996 | Clark |
| 5,521,980 A | 5/1996 | Brands |
| 5,526,037 A | 6/1996 | Cortjens et al. |
| 5,526,409 A | 6/1996 | Conrow et al. |
| 5,530,844 A | 6/1996 | Phillips et al. |
| 5,544,161 A | 8/1996 | Bigham et al. |
| 5,544,246 A | 8/1996 | Mandelbaum et al. |
| 5,544,320 A | 8/1996 | Konrad |
| 5,546,582 A | 8/1996 | Brockmeyer et al. |
| 5,548,721 A | 8/1996 | Denslow |
| 5,550,561 A | 8/1996 | Ziarno |
| 5,550,984 A | 8/1996 | Gelb |
| 5,552,586 A | 9/1996 | Kalman |
| 5,557,203 A | 9/1996 | Nauerth |
| 5,563,878 A | 10/1996 | Blakely et al. |
| 5,570,465 A | 10/1996 | Tsakanikas |
| 5,577,233 A | 11/1996 | Goettelmann |
| 5,581,478 A | 12/1996 | Cruse et al. |
| 5,581,686 A | 12/1996 | Koppolu et al. |
| 5,581,708 A | 12/1996 | Iijima |
| 5,583,940 A | 12/1996 | Vidrascu et al. |
| 5,586,036 A | 12/1996 | Pinstov |
| 5,586,175 A | 12/1996 | Hogan et al. |
| 5,590,038 A | 12/1996 | Pitroda |
| 5,590,133 A | 12/1996 | Billstrom et al. |
| 5,590,181 A | 12/1996 | Hogan et al. |
| 5,590,196 A | 12/1996 | Moreau |
| 5,590,197 A | 12/1996 | Chen et al. |
| 5,590,199 A | 12/1996 | Krajewski, Jr. et al. |
| 5,594,910 A | 1/1997 | Filepp et al. |
| 5,602,905 A | 2/1997 | Mettke |
| 5,602,915 A | 2/1997 | Campana et al. |
| 5,602,918 A | 2/1997 | Chen et al. |
| 5,604,802 A | 2/1997 | Holloway |
| 5,606,493 A | 2/1997 | Duscher et al. |
| 5,613,012 A | 3/1997 | Hoffman et al. |
| 5,613,096 A | 3/1997 | Danknick |
| 5,615,251 A | 3/1997 | Hogan et al. |
| 5,623,547 A | 4/1997 | Jones et al. |
| 5,630,101 A | 5/1997 | Sieffert |
| 5,633,919 A | 5/1997 | Hogan et al. |
| 5,638,430 A | 6/1997 | Hogan et al. |
| 5,640,193 A | 6/1997 | Wellner |
| 5,642,485 A | 6/1997 | Deaton et al. |
| 5,649,114 A | 7/1997 | Deaton et al. |
| 5,649,118 A | 7/1997 | Carlisle et al. |
| 5,652,876 A | 7/1997 | Ashe et al. |
| 5,655,008 A | 8/1997 | Futch et al. |
| 5,664,110 A | 9/1997 | Green et al. |
| 5,666,412 A | 9/1997 | Handelman et al. |
| 5,668,878 A | 9/1997 | Brands |
| 5,677,953 A | 10/1997 | Dolphin |
| 5,677,955 A | 10/1997 | Doggett et al. |
| 5,678,002 A | 10/1997 | Fawcett |
| 5,679,945 A | 10/1997 | Renner et al. |
| 5,687,322 A | 11/1997 | Deaton et al. |
| 5,689,799 A | 11/1997 | Dougherty et al. |
| 5,694,471 A | 12/1997 | Chen et al. |
| 5,694,546 A | 12/1997 | Reisman |
| 5,696,903 A | 12/1997 | Mahany |
| 5,703,795 A | 12/1997 | Mankovitz |
| 5,706,273 A | 1/1998 | Guerreri |
| 5,708,780 A | 1/1998 | Levergood et al. |
| 5,708,782 A | 1/1998 | Larson et al. |
| 5,708,825 A | 1/1998 | Sotomayor |
| 5,710,884 A | 1/1998 | Dedrick |
| 5,715,314 A | 2/1998 | Payne et al. |

| | | |
|---|---|---|
| 5,722,754 A | 3/1998 | Langner |
| 5,724,506 A | 3/1998 | Cleron et al. |
| 5,729,549 A | 3/1998 | Kostreski et al. |
| 5,732,219 A | 3/1998 | Blumer et al. |
| 5,734,720 A | 3/1998 | Salganicoff |
| 5,742,845 A | 4/1998 | Wagner |
| 5,742,931 A | 4/1998 | Spiegelhoff et al. |
| 5,748,908 A | 5/1998 | Yu |
| 5,754,655 A | 5/1998 | Hughes et al. |
| 5,756,978 A | 5/1998 | Soltesz et al. |
| 5,758,257 A | 5/1998 | Herz et al. |
| 5,778,067 A | 7/1998 | Jones et al. |
| 5,781,189 A | 7/1998 | Holleran et al. |
| 5,799,156 A | 8/1998 | Hogan et al. |
| 5,805,719 A | 9/1998 | Pare, Jr. et al. |
| 5,805,807 A | 9/1998 | Hanson et al. |
| 5,809,415 A | 9/1998 | Rossmann |
| 5,815,577 A | 9/1998 | Clark |
| 5,815,657 A | 9/1998 | Williams et al. |
| 5,819,092 A | 10/1998 | Ferguson et al. |
| 5,826,245 A | 10/1998 | Sandberg-Diment |
| 5,838,906 A | 11/1998 | Doyle et al. |
| 5,850,442 A | 12/1998 | Muftic |
| 5,851,149 A | 12/1998 | Xidos et al. |
| 5,854,833 A | 12/1998 | Hogan et al. |
| 5,867,821 A | 2/1999 | Ballantyne et al. |
| 5,870,552 A | 2/1999 | Dozier et al. |
| 5,870,724 A | 2/1999 | Lawlor et al. |
| 5,873,099 A | 2/1999 | Hogan et al. |
| 5,884,292 A | 3/1999 | Baker et al. |
| 5,889,863 A | 3/1999 | Weber |
| 5,931,917 A | 8/1999 | Nguyen et al. |
| 5,933,816 A | 8/1999 | Zeanah et al. |
| RE36,310 E | 9/1999 | Bjerrum et al. |
| 5,953,731 A | 9/1999 | Glaser |
| 5,960,216 A | 9/1999 | Vishlitzky et al. |
| 5,963,205 A | 10/1999 | Sotomayor |
| 5,973,731 A | 10/1999 | Schwab |
| 5,978,569 A | 11/1999 | Traeger |
| 5,978,773 A | 11/1999 | Hudetz et al. |
| 5,982,891 A | 11/1999 | Ginter et al. |
| 5,983,004 A | 11/1999 | Shaw et al. |
| 5,987,312 A | 11/1999 | Dekker |
| 5,996,076 A | 11/1999 | Rowney et al. |
| 6,085,224 A | 7/2000 | Wagner |
| 6,112,191 A | 8/2000 | Burke |
| 6,175,922 B1 | 1/2001 | Wang |
| 6,182,052 B1 | 1/2001 | Fulton et al. |
| 6,205,437 B1 | 3/2001 | Gifford |
| 6,208,904 B1 | 3/2001 | Mullen, Jr. |
| 6,212,575 B1 | 4/2001 | Cleron et al. |
| 6,226,744 B1 | 5/2001 | Murphy et al. |
| 6,226,752 B1 | 5/2001 | Gupta et al. |
| 6,253,027 B1 | 6/2001 | Weber et al. |
| 6,275,869 B1 | 8/2001 | Sieffert et al. |
| 6,279,112 B1 | 8/2001 | O'Toole, Jr. et al. |
| 6,282,656 B1 | 8/2001 | Wang |
| 6,283,375 B1 | 9/2001 | Wilz, Sr. et al. |
| 6,470,326 B1 | 10/2002 | Drummond et al. |
| 6,505,177 B1 | 1/2003 | Drummond et al. |
| 6,539,361 B1 | 3/2003 | Richards et al. |

OTHER PUBLICATIONS

M. Frans Kaashoek, Tom Pinckney and Joshua A. Tauber—"Dynamic Documents: Mobile Wireless Access to the WWW"; Dec., 1994; available online at http://216.239.57.104/search?. q=cache:pG8YP_Zirm6QJ:www.pdos.1cs.mit.edu/papers/wmcsa94.ps+Dynamic+Documents:+Mobile+Wireless+Access+to+the+wwws hl=en.

"Viola in a Nutshell: The Viola World Wide Web Toolkit", http://www.xcf.berkeley.edu/~wei/viola/book/, Apr. 1995 (176 pages).

O'Reilly & Associates, Inc., ViolaWWW, Version 3.3 Beta, Features List, http://www.xcf.berkely.edu/~wei/viola/README.txt, Apr. 10, 1995 (2 pages).

Wei, Pei, "A Brief Overview of the VIOLA Engine, and its Applications",http://www.xcf.berkeley.edu/~wei/viola/violaIntro.html, Aug. 16, 1994, (13 pages).

Wei, Pei, "WWW Browsers: Extensibility Issues", O'Reilly & Associates, Sep. 20, 1994, (13 pages).

"Basic HTTP as defined in 1992", W3C, http://www.w3.org/Protocols/HTTP/HTTP2.html, 1992, (125 pages).

McCool, Rob, "CGI/1.0: last call", Dec. 4, 1993 (1 page).

"Olde Viola Montage", http://www.xcf.berkeley.edu/~wei/viola/vintage/montage.html, 1991, (5 pages).

Masinter, Larry "Naming and resource location", Stanford Computer Forum WWW Workshop, Sep. 20, 1994, (1 page).

Cousins, Steve and Shoham Yoav, "Software Agents on the WWW", Stanford Computer Forum WWW Workshop, Sep. 20, 1994, (1 page).

Winograd, Terry, "Web Structure and Meta–Information", Stanford Computer Forum WWW Workshop, Sep. 20, 1994, (1 page).

Shafrir, Eviatar, "Interacting with Information", Stanford Computer Forum WWW Workshop, http://www-pcd.stanford.edu/workshop/abstracts/shafrir.html, Sep. 20, 1994 (2 pages).

Gruber, Tom, "Virtual Documents", Stanford Computer Forum WWW Workshop, Sep. 20, 1994, (21 pages).

Keller, Arthur M., "CIT's Work on CommerceNet", Center for Information Technology, Standford University, http://cit.stanford.edu/cit/comercenet.html, Oct. 1994, (6 pages).

Shapiro, Ehud, "Enhancing the WWW with co–presence", Stanford Computer Forum WWW Workshop, Sep, 20, 1994, (9 pages).

"Readings for Stanford WWW Workshop", Stanford Computer Forum, http://www-pcd.stanford.edu/workshop/readings.html, Sep. 20, 1994, (3 pages).

"WorldWideWeb–Summary", http://www.w3.org/Summary.html, 1992, (2 pages).

"The Original HTTP as defined in 1991", http://www.w3.org/Protocols/HTTP/AsImplemented.html, 1991, (2 pages).

"WorldWide Web Seminar", http://www.w3.org/Talks/General/About.html, 1993, (15 pages).

White, Sean, "Online Communities on the WWW", Stanford Computer Forum WWW Workshop, Sep. 20, 1994, (1 page).

"The Common Gateway Interface", http://hoohoo.ncsa.uiuc.edu/cgi/, 1994, (23 pages).

"W3C: Object MetaInformation", http://www.w3.org/Protocols/HTTP/Object_Headers.html, 1992, (9 pages).

"Hypertext Markup Language (HTML)", http://www.w3.org/MarkUp/1995–archive/ 1, 1995, (66 pages).

McCool, Rob, "Re: CGP/1.0 specification", Nov. 19, 1993 (2 pages).

McCool, Rob, "Revised CG1/1.0 specification", Nov. 19, 1993, http://www.webhistory.org/www–talk.1993q4/0540.html, (1 page).

Citation List of References noting "The Common Gateway Interface", CiteSeer, 2002, (6 pages).

Robinson, David and Coar, Ken, "The Common Gateweay Interface (CGI) Version 1.1", Apr. 16, 2003, ( 30 pages).

Varela, Carlos and Hayes, Caroline, "Providing Data on the Web: From Examples to Programs", Dept. Computer Science, University of Illinois at Urbana–Champaign, http://archive.ncsa.uiuc.edu/SDG/IT94/Proceedings/DDay/varela/. Oct. 17, 1994, (26 pages).

Dynamic Information Systems Corporation, "Developing JDBC Servlet Applications", http://www.disc.com/idbc-serv.html, May, 08, 2002, (12 pages).

ProSolutions, Inc. Active Server Pages (ASP) Technology, http://www.prosolutionsinc.com/asp.htm, 2002, (2 pages).

Rasmussen, B.F., "WDB—A Web Interface to Sybase", http://www.stsci.edu/stsci/meetings/adassIV/rasmussen-b.html, 1995, (4 pages).

"Europay Members Forum", Europay International, May 8, 2001, (3 pages).

"NCR 2170 Hospitality Workstation Designed for Bars, Restaurants", AT&T News Release, Feb. 2, 1993, (2 pages).

"AT&T to Increase Smart Card Reliability, Expand Memory to 8KB", AT&T News Release, Apr. 8, 1994, (2 pages).

"AT&T and NCR Offer Smart Card Upgrade Kits for Bank ATMs", AT&T News Release, Nov. 17, 1993, (2 pages).

"The Smart Card Cashes In", The Economist, Jan. 29, 1994, (2 pages).

"NCR 7450 Terminal Brings ATM–style Interface to Point–of–Sale", AT&T News Release, Oct. 11, 1993, (4 pages).

"Mastercard Smart Card Milestones", MasterCard International Press Office, Mar. 5, 2001, (3 pages).

Svigals, Jerome, "Microchip Smart Cards Will Save Money", American Banker, Feb. 2, 1994, (1 page).

Bartliel, Matt, "Fears of Crime at ATMs are on the Rise", American Banker, Mar. 30, 1994, (1 page).

"Smart Card Forum Publication List", Smart Card Forum, Mar. 2, 2001, (7 pages).

"Appendix: Major Electronic Purse Projects, By Country", pp. 35–50 and 52–64, Date Unknown (29 pages).

O'Kelly, Robin, "Mondex 'Global Electronic Cash' Wins IIelsinki Award", Sep. 8, 1996, (2 pages).

"White Paper—The Euro in the Electronic Purse", Apr. 2000, (5 pages).

"History of Gemplus", Gemplus, Mar. 2, 2001, (3 pages).

Pauli, Ralf and Koponen, Risto, "Toward Electronic Money", Bank of Finland Bulletin, Apr. 1997, (3 pages).

"A Frequently Asked Questions List (FAQ) for alt.techology.smartcards", Estonian Institute of Cybernetics, Jul. 4, 1995, (12 pages).

Husemann, Dirk, "The Smart Card: Don't Leave Home Without It", Institute of Electrical and Electronics Engineers, Inc., Sep. 18, 2000, (9 pages).

"Report to the Council of The European Monetary Institute on Prepaid Cards", The Working Group on EU Payment Systems, May 1994, (12 pages).

Banerjee, Ram, "Smart Card Standards and Electronic Purse, A Review Paper", Aston University, May 1997, (20 pages).

Townend, Robin C., "Finance: History, Development & Market Overview", The International Smart Card Industry Guide, 1995–1996, (23 pages).

Monod, Elsbeth Marikje, "Case Study: The Multi–Functional Smart Carte Sante", The International Smart Card Industry Guide, 1995–1996, (8 pages).

Smith, Jack, "Smart Card Industry Review 1995", Smart Card Monthly Newsletter, Jan. 1996, (6 pages).

Crotch–Harvey, Trevor, "Smart Cards in Telecoms", The International Smart Card Industry Guide, 1995–1996, (14 pages).

Farmer, Donna and Tonnae, Remy de, "What's So Smart About Smart Cards", Gemplus, Oct. 10, 2000, (1 page).

"P401 Definition of a pan–European IC Card", Eurescom, Mar. 5, 2001, (1 page).

"Innovonics, Inc. Selects AMP as Manufacturer for the PC Pay Module", Innovonics News Release, May 19, 1995, (3 pages).

Levy, Steven, "E–Money (That's What I Want)", Wired, Dec., 1994, (2 pages).

Fickenscher, Lisa, "Banc One Gears Up to Go National With Its Microchip Smart Cards", American Banker, Jan. 27, 1994 (2 pages).

Strachman, Daniel and Kutler, Jeffrey, "Convention Goers See Bank Future in Smart Cards", American Banker, Nov. 30, 1993, (1 page).

Meece, Mickey, "First Data Strengthens Position in Card Processing", American Banker, Dec. 21, 1993, (1 page).

Kutler, Jeffrey, "Prepaid Cards, Even in Concept Stage, Sparking Interest Among Consumers", American Banker, Apr. 27, 1994, (1 page).

Kutler, Jeffrey, "Visa Starts Push for Smart Card to Replace Cash", American Banker, Mar. 22, 1994, (2 pages).

"AT&T Introduces Enhanced Multimedia Interface for ATM Networks", AT&T News Release, May 4, 1994, (2 pages).

"Trendar and AT&T Test Contactless Smart Cards at Truck Stops", AT&T News Release, Feb. 26, 1993, (3 pages).

"NCR Announces 5980 Signature Capture System for Retailers", AT&T News Release, Sep. 30, 1991, (2 pages).

Merckling, Roger and Anderson, Anne, "Smart Card Introduction", Mar. 1994,(16 pages).

Merckling, Roger and Anderson, Anne, "DCe Smart Card Integration", Mar. 1994, (16 pages).

"Chapter2—Technology", Smart Card Primer, The Schuler Consultancy, ©1993, pp. 13–24 and 26–29, (16 pages).

"CP8® PRODUCTS, PASCAM, Network Security Processor", Jan. 1994, (4 pages).

"Notes on Open Networks and Device Addressing", IBM Corporation, Apr. 25, 2001, (19 pages).

Chakrabarti, Samdih, Knight, James and Thies, Bill, "A Centralized Smart Card System Utilizing Distributed Proxies", 2000, University of Leeds, (16 pages).

"Single–Issuer Multiple Uses", Smart Card Primer, The Schuler Consultancy, ©1993, (3 pages).

Sazegar, Hossein, "The Impact of Smart Cards in the Global Payphone Business", Schlumberger Technologies, ©1992, (11 pages).

Derksen, Eduard, "Money–Bit: The Open Off–Host Prepaid Card System", Ascom Autelca, Ltd., Date Unknown, (10 pages).

Corzo, Gerardo, "Credisa's Elite Card System", Date Unknown, (5 pages).

Cordonnier, Vincent M., "Assessing the Future of Smart Cards", Cardtech, Date Unknown, (7 pages).

"NatWest Launch Mondex Global Electronic Cash", Smart Card News, Ltd., Dec. 1993, (7 pages).

Merkert, Sr., Robert J., "Stored Value Cards and The Electronic Purse: Developments in the Americas", Danyl Corporation, ©1995, (8 pages).

"CP8® Products, PinPadLINK, Readers/Encoders", Dactyl France, Jun. 1993, (2 pages).

"Smart Security", Byte Talk, Feb., 1994, (2 pages).

Verschuren, Ton, "Smart Access: Strong Authentication on the Web", Apr. 24, 2001, (10 pages).
"PKCS #11: New Member of Public Key Cyrptography", RSA Data Security, Inc., Jan. 12, 1994, (2 pages).
Petri, Steve, "An Introduction to Smarcards", Litronic, Inc., ©1998, (2 pages).
Violino, Bob, "The Cashless Society", InformationWeek, Oct. 11, 1993, (5 pages).
Merkert, Sr., Robert J., 'Keynote Presentation for the AIC Conference, Auckland, New Zealand', Danyl Corporation, ©1995, (4 pages).
"Videoway's Experience Shows a New Approach to the Interactive Opportunity", Inside Cable and Telecom Services, Jun. 1995, (3 pages).
Bull CP8® News, Products and Technologies, No. 22, Oct. 1994, (2 pages).
Bull CP8® Systems Product Sheet, Sep. 1994, (2 pages).
"One Store's Comprehensive Loyalty Program—The Takashimaya Experience", Verifone, Inc., ©1994, (4 pages).
"Mondex Payments Scheme", Smart Card News Ltd., Dec. 1993, (2 pages).
"Why Consumers Are Still Carrying Cash Everywhere", Philadelphia Inquirer, Jun. 11, 1995, (2 pages).
"Electronic Payment System Architecture for Point of Sale Applications", IBM Technical Disclosure Bulletin, Jan. 1992, (1 page).
"Portable Self Checkout Retail System", IBM Technical Disclosure Bulletin, Jun. 1992, (3 pages).
"Transaction Completion Code Based on Digital Signatures", IBM Technical Disclosure Bulletin, Aug. 1985, (6 pages).
"Chapter 4—Uses", Smart Card Primer, The Schuler Consultancy, ©1993, pp. 57–66, 80–83, and 87–91, (19 pages).
Figure 8.5 from p. 151 of Zoreda & Oton "Smart Cards", Artech House, ©1994, (1 page).
"Internet Music Library Process", Date Unknown, (1 page).
Bibliography for "CITM Working Paper WP–95–1005: Designing Electronic Catalogs for Business Value: Results from the CommerceNet Pilot", Date Unknown, (3 pages).
Van Hove, Leo, Bibliography on Electronic Purses, Date Unknown, (4 pages).
Bibliography for "CITM Working Paper WP–95–1006: Financial EDI Over the Internet: A Case Study", Date Unknown, (5 pages).
Bibliography for Hawkes, P.L., Davies, Donald W., and Price, W.L., "Integrated Circuit Cards, Tags, and Tokens: New Technology and Applications", Oxford; Boston: BSP Professional, ©1990, (1 page).
Bibliography for Devargas, M., "Smart Cards and Memory Cards", Oxford; Blackwell NCC, ©1992, (1 page).
Bibliography for Svigals, Jerome, "Smart Cards: The New Bank Cards", New York: Macmillan; London: Collier Macmillan Publishers, ©1987, (1 page).
Bibliography for Bright, Roy, "Smart Cards: Principles, Practice, Applications", Chichester [England]: Ellis Horwood; New York: Halsted Press, ©1988, (1 page).
Bibliography for Svigals, Jerome, "Smart Cards: The Ultimate Personal Computer", New York: Macmillan Publishing Co.; London: Collier Macmillan, ©1985, (1 page).
Bibliography for "Applications of Computer Card Technology", Washington, D.C., U.S. Dept. of Labor, Office of the Inspector General, [1990], (1 page).

German article entitled "Erfahrungen Mit Einer Hochsicheren, Multifunktionalen Chipkarte fur Bankenanwendungen" Date Unknown, (21 pages).
Document entitled "Dialog Search for U.S. Patent No. 5,905,908", Date Unknown, (59 pages).
UBI Consortium Inc. Document, Mar. 26, 2001 (2 pages).
HTML file entitled: "The Common Gateway Interface", available at httpd@ncsa.uiuc.edu, circa, Jun. 1995.
HTML file entitled: "Critique of Secure–HTTP", available at shttp://www.spyglass.com/secure, Apr. 19, 1995.
Directory of abstracts of HTML files available from IEFT Secretariat—Corporation for National Research Initiatives; circa, Jun. 1995.
HTML file entitled: "A Beginner's Guide to HTML" available from National Center for Supercomputing Applications/pubs@ncsa.uiuc.edu; circa, Jun. 1995.
Memo entitled: "Uniform Resource Locators (URL)", by URI working group of the Internet Engineering Task Force; Dec. 1994.
Press release entitled: "VeriFone to acquire Enterprise Integration Technologies (EIT), Internet Commerce Software and Services Leader", VeriFone, Inc. and Enterprise Integration Technologies; Redwood, California; Aug. 21, 1995.
Spyglass white paper entitled: "Electronic Commerce Standards for the WWW"; Spyglass, Inc. http://spyglass.com; Aug. 21, 1995.
Memo entitled: "The Secure Hypertext Transfer Protocol"; E. Rescorla and A. Schiffman; Jul. 1995.
Article entitled: "Cash on the Wirehead", Andrew Singleton, BYTE Magazine, Jun. 1995.
"Beyond the Web: Excavating the Real World Via Mosaic", Goldberg et al., 2nd International WWW Conference.
"Magnetic Resonance Angiography", Radiology 1986; 161, pp. 717–720, Dumoulin et al.
"Velocity and Diffusion Imaging in Dynamic NMR Microscopy", JMR 91, pp. 326–352, 1991, Callaghan et al.
"Reduced Circular Field–of–View Imaging", MRM 40:474–480, 1998, Scheffler et al.
"Measurement of Flow Using Back Projection Reconstruction: Display of Limited Regions of the Body", Young et al.
Salsman, James P., "Form–based Device Input and Upload in HTML", available at http://www.w3.org/1999/07 /NOT-E–device–upload–19990706, Cisco Systems, © 1999, Jul. 6, 1999 (9 pages).
Memo entitled: "Form–based File Upload in HTML", E. Nebel and L. Masinter, Network Working Group of Xerox Corporation, Nov. 1995 (12 pages).
HTML file entitled: "IITML 3.0 Draft (Expired!) Materials", available at http://www.w3.org/MarkUp/html3, Dec. 21, 1995 (4 pages).
Berners–Lee, T. and Connolly, D., HTML file entitled: "HyperText Markup Language Specification—2.0", available available at http://www.w3.org/MarkUp/html–spec., Nov. 1995 (10 pages).
Raggett, David, HTML file entitled: "A Review of the HTML + Document Format", Hewlett Packard Laboratories, date unknown (13 pages).
Raggett, David, HTML file entitled: "10–Fill–out Forms and Input Fields", available at http://www.w3.org/MarkUp HTMLPlus/htmlplus__41.html, Nov. 8, 1993 (5 pages).
Raggett, David, HTML File entitled: "ISO 8879:1986", available at http://www.w3.org/MarkUp/htmlplus__paper /htmlplus.dtd, Apr. 5, 1994 (17 pages).

Riordan, T., "A Toll Collector on the Information Highway", *The New York Times*, Sunday, Aug. 22, 1993, (3 pages).

Burchard et al., "Compount Documents in HTML", Internet Draft Memo, Date Unknown, (14 pages).

Press Release, "Netscape Introduces Netscape Navigator 2.0", Netscape *Company* Press Relations, Sep. 18, 1995, (3 pages).

Stabell, B., The EMBED Tag by Netscape (v2.0), Sep. 19, 1995, (9 pages).

Article entitled, "Eolas Sues Microsoft for Infringement of Patent for Fundamental Web Browser Technology That Makes "Plug–Ins" and "Applets" Possible", Chicago, Illinois, Feb. 2, 1999, (2 pages).

Sottong, S., "Quick HTML Basics", Date Unknown, (12 pages).

Ang et al., "Integrated Control of Distributed Volume Visualization Through the World–Wide–Web", Oct. 30, 2001, (8 pages).

Krajewski, Jr., et al., "Applicability of Smart Cards to Network User Authentication", *Computing Systems*, vol. 7, No. 1, Winter 1994, (15 pages).

"Financial Institution Sing–On Authentication for Wholesale Financial Transactions", American National Standards Institute, X9.26, Feb. 28, 1990, (35 pages).

Kohl et al., "The Evolution of *Kerberos* Authentication Service", Date Unknown, (15 pages).

Cordonnier et al., "Times as an Aid to Improving Security in Smart Cards", Date Unknown, (14 pages).

Cordonnier et al., "The Concept of Suspicion: A New Security Model for Identification Management in Smart Cards", Date Unknown, (14 pages).

Haykin et al., "Computer Science and Technology—Smart Card Technology: New Methods for Computer Access Control", U.S. Department of Commerce, National Technical Information Service, Sep. 1998, (55 pages).

Rescorla et al., "The Secure HyperText Transfer Protocol", Internet Draft Memo, Dec. 1994, (29 pages).

Takei, D., "Videotex Information System and Credit System Connecting with MARS–301 of JNR", *Japanese Railway Engineering*, No. 95, Sep. 1985, (5 pages).

Pongratz et al., "IC Cards in Videotex Systems", *Smart Card 2000: The Future of IC Cards*, International Conference, Oct. 19–20, 1987, (9 pages).

Neuman, B.C., "Security, Payment, and Privacy for Network Commerce", *IEEE Journal on Selected Areas in Communication*, vol. 13, No. 8, Oct. 1995, (8 pages).

Zilles, S.N., "Catalog–Based Order Entry System", IBM Technical Disclosure Bulletin, vol. 25, No. 11B, Apr. 1983, (3 pages).

Article entitled, "PKCS #11: New Member of Public Key Crytography", available online at http://www.rsasecurity.com/news/pr/940112–1.html., Jan. 12, 1994, (12 pages).

Kessler, J., "The French Minitel: Is There Life Outside of the 'US ASCII' Internet? A Challenge of Convergence", *D–Lib Magazine*, Dec. 1995, (10 pages).

Schöter et al., "Digital Money Online, A Review of Some Existing Technologies", Intertrader Ltd., ©Feb. 1997, (60 pages).

Sutherland, E., "The Quickening Pace of Technology", ©1995, (3 pages).

Article entitled "NetBill: An Internet Commerce System Optimized for Network Delivered Services", Date Unknown, (9 pages).

Reagle, Jr., et al., expanded bibliography for "Papers Describing the Operation of Electronic Commerce Protocols", Date Unknown, (3.pages).

Article entitled "ISO/IEC 7816 Part 4: Interindustry Command for Interchange", Nov. 26, 1998, (77 pages).

1991 Statement on Role of NIST, available online at http://csrc.nist.gov/publications/nistbul/cs191–02.txt, Jun. 17, 1992, (38 pages).

Kirkman, P., "Electronic Funds Transfer Systems: The Revolution in Cashless Banking and Payment Methods", ©1987, (14 pages).

Fancher, C., "Smart Cards: As Potential Applications Grow, Computers in the Wallet are Making Unobtrusive Inroads", *Scientific American*, Date Unknown, (10 pages).

Walsh, E., "Smart Card Standards", Datapro Information Services, Aug. 25, 2000, (10 pages).

Article entitled "The Birth of Smart Cards: 1980", Le Courier de la Monétique, Date Unknown, (2 pages).

Article entitled "The Birth of Smart Cards: 1981", Le Courier de la Monétique, Date Unknown, (3 pages).

Article entitled "The Birth of Smart Cards: 1982", Le Courier de la Monétique, Date Unknown, (2 pages).

Article entitled "The Birth of Smart Cards: 1983", Le Courier de la Monétique, Date Unknown, (2 pages).

Article entitled "The Birth of Smart Cards: 1984", Le Courier de la Monétique, Date Unknown, (3 pages).

Article entitled "The Birth of Smart Cards: 1985", Le Courier de la Monétique, Date Unknown, (2 pages).

Article entitled "The Birth of Smart Cards: 1986", Le Courier de la Monétique, Date Unknown, (2 pages).

Article entitled "The Birth of Smart Cards: 1987", Le Courier de la Monétique, Date Unknown, (2 pages).

Article entitled "The Birth of Smart Cards: 1988", Le Courier de la Monétique, Date Unknown, (2 pages).

Article entitled "The Birth of Smart Cards: 1989", Le Courier de la Monétique, Date Unknown, (2 pages).

Doyle, M., University of California, San Diego, Office of Continuing Medical Education, Disclosure Statement, Nov. 30, 1993, (10 pages).

Article entitled "Workshop on Network and Distributed System Security", Privacy and Research Group, Feb. 11–12, 1993, (5 pages).

Krajewski, Jr., M., "Concept for a Smart Card Kerberos", Jan. 22, 2002, (8 pages).

Kohl et al., "The Kerberos Network Authentication Service (V5)", Sep. 1993, (103 pages).

Nebel, E., "File Upload in HTML Forms", Sep. 23, 1994, (4 pages).

Raggett, D., E–mail memo entitled "Re: Request for New Forms Submission Consensus", Oct. 12, 1993, (4 pages).

Gaskell et al., "Improved Security for Smart Card Use in DCE", Feb. 1995, (17 pages).

Pato, J., "Using Pre–Authentication to Avoid Password Guessing Attacks", Jun. 1993, (5 pages).

Shipplett, M., E–mail memo entitled "Re: Insecure WWW Access Authorization Protocol?", Mar. 7, 1994, (3 pages).

"Financial Transaction Card Originated Messages—Interchange Message Specifications", International Standard, Second Edition, Dec. 15, 1993, (128 pages).

Various articles on the subject "1994 NIST Guideline for Advanced Authentication (Smart Cards)", Date Unknow, (73 pages).

Allen et al., "Smart Cards: Seizing Strategic Business Opportunities", The Smart Card Forum, ©1997 The McGraw–Hill Companies, (323 pages).

Fielding et al., "Hypertext Transfer Protocol—HTTP/1.1", Jan. 1997, (162 pages).

Branwyn, G., "M·O·S·A·I·C Quick Tour for Windows: Accessing & Navigating the Internet's World Wide Web", ©1994 Ventana Press, Inc., (215 pages).

Shelly et al., "Netscape Navigator: An Introduction", ©1996 Boyd & Fraser Publishing Company, (138 pages).

James, P., "Official Netscape Navigator 2.0 Book: Windows Edition", ©1996, Ventana Press, Inc., (692 pages).

Article entitled "A Smart Card for On–Line Home Services", ChipCord News, Issue No. 32, Jul. 1990, (2 pages).

Bosak etal:, "XML and the Second Generation Web", *Scientific American*, May 1999, (5 pages).

Beners–Lee et al., "RFC1866–Hypertext Markup Language–2.0", Nov. 1995, (58 pages).

Burchard et al., "Compound Documents in HTML", Internet Draft Memo, Date unknown, (14 pages).

Hansen, Wilfred J., "Enhancing Documents with Embedded Programs: How Ness Extends Insets in the Andrew Tool-Kit", IEEE 1990, pp. 23–32, (10 pages).

Tani, M., Yamaashi,K., Tanikoshi, K., Futakawa, M. and Tanufuji, S., "Object–Oriented Video: Interaction with Real-World Objects Through Live Video", ACM 1992, pp. 593–598, (6 pages).

Crowley, T. Milazzo, P., Baker, Forsdick, H. and Tomlinson, R., "MMConf. An Infrastructure for Building Shared Multimedia Applications", ACM 1990, pp. 329–342 (14 pages).

Davis, H., W., Heath, I., Hill, G. and Wilkins, R., "Towards an Integrated Information Environment with Open Hypermedia Systems", ACM 1992, pp. 181–191, (10 pages).

Ferrara, Fabrizio, M., "The KIM Query System: An Iconic Interface for the Unified Access to Distributed Multimedia Databases", SIGGHI Bulletin 1994, vol. 26, No. 3, pp. 30–39, (10 pages).

Gibbs, Simon, "Composite Multimedia and Active Objects", OOPSLA 1991, pp. 97–112, (16 pages).

Davis, H. Hall, W., Pickering A. and Wilkins, R., "Microcosm: An Open Hypermedia System", ACM, 1993, (1 page).

Cullen J., Day, B. and Planes, M., "The Use of FTAM to Access Graphical Pictures Across Wide Area Networks", Elsevier Science Publishers B.V. 1992, pp. 377–383, (19 pages).

Vaziri, Arsi, "Scientific Visualization in High–Speed Network Environments", Elsevier Science Publishers B.V. 1991, pp. 111–129, (19 pages).

Lashkari, Y., Rao, S., Mhaskar, V. and Shelat, A., "PLX: A Proposal to Implement a General Broadcasting Facility in a Distributed Environment Runnig X Windows", Comput. & Graphics, vol. 16, No. 2, 1992, pp. 143–149, (7 pages).

Kirste, Thomas, "SpacePicure–An Interactive Hypermedia Satellite Image Archival System", Comput. & Graphics, vol. 17, No. 3, 1993, pp. 251–260, (10 pages).

Coulson, G., Blair, G., Davis, N. and Williams, N. "Extensions to ANSA for Multimedia Computing", Elsevier Science Publishers B.V. 1992, pp. 305–322, (18 pages).

Le Huynh, D., Jensen, M., Larsen, R., Southard, J., and Wang, F., "PIX: An Object–Oriented Network Graphics Environment", Comput. & Graphics, vol. 17, No. 3, 1993, pp. 295–304, (10 pages).

Berners–Lee, T.J., Cailliau, R., and Ggroff, J., "The World-Wide Web", Elsevier Science Publishers B.V. 1992, pp. 454–459, (6 pages).

Shackleford, D., Smith, J. and Sith, F. "The Architecture and Implementation of a Distributed Hypermedia Storage System", Nov., 1993, pp. 1–13, (13 pages).

Labriola, Don, "Whiteboard Software: Remote Possibilities", PC Magazine, Jun. 14, 1994, pp. 223–224, (2pages).

"How We Evaluate the Whiteboard Software". PC Magazine, Jun. 14, 1994, pp. 225–228, (4 pages).

Udell, John, "Visual Basic Custom Controls Meet OLE", BYTE, Mar. 1994, pp. 197–198 and 200, (3 pages).

Sarna, D. and Febish, G., "OLE Gains Without (Much) Pain", DATAMATION, Jun. 15, 1994, pp. 31, (1page).

Scrupski, Susan, "Outsourcing: It Could be Good", DATAMATION, Jun. 15, 1994, pp. 32–33 and 114, (3 pages).

Rizzo, John, "What's OpenDoc?", MacUser, Apr. 1994, pp. 119–123, (3pages).

Cello Browser Release 1.01a ftp:law.cornell.edu/pub/LIl/cello, Mar. 16, 1994, (8 pages).

"Why Jim Clark Loves Mosaic", Wired, Oct. 1994, pp. 118–121, 150–151 and 157, (7 pages).

Marovac, N. and Obburn, L., "Hypernet: A Tool to Choreograph Worldwide Distributed Hypermedia Documents", Comput. & Graphics, vol. 16, No. 2, 1992, pp. 197–202, (6 pages).

Moeller, M. and Leach, N., "Microsoft Maps New OCX Plan: Active X seen as Web Content Platform", PC Week, Mar. 11, 1996, vol. 13, No. 10, pp. 1–2, (2 pages).

"OLE 2.0: Death to Monoliths?", BYTE, Mar. 1994, pp. 121–122, (2 pages).

"Netscape Communications Offers New Network Navigator Free on the Internet", http://home.netscape.com/newsref/pr/newsrelease1.html, Jan. 29, 1998.

Sackman, Gleason, "Remote Tele–Excavation via the Web", Tele–robotics, vol. 11, Issue 9, (1 page).

Wolf, Gary, "The (Second Phase of) the Revolution has Began", WIRED, Oct. 1994, pp. 16–17, (2 pages).

Wynne, B. and Marovac, N., "Lean Management, Group Support Systems and Hypermedia: A Combination Whose Time Has Come", IEEE, 1993, pp. 112–121, (10 pages).

Moran, Patrick J., "Tele–Nicer–Slicer–Dicer: A New Tool for the Visualization of Large Volumetric Data", Biomedical Imaging Group, pp. 1–7, (7 pages).

Hansen, W. and Consortium, A. "Andrew as a Multiple Environment for Visual Languages", IEEE, 193, pp. 256–260, (5 pages).

Doyle, M., The Virtual Embryo: VR Applications in Human Development Anatomy, Jan. 27, 1994, pp. 1–9, (9 pages).

Doyle, M., "A Knowledge Management Environment through the World Wide Web", Jan. 07, 1994.

Oliver, D. et al., "Netscape™ Unleashed".

Ang, C., Martin, D. and Doyle, M., "Integrated Control of Distributed Volume Visualization Through the World–Wide Web", 1994, pp. 1–10 (10 pages).

Hume, Tom, "WAP: Where we've come from, where we are, where we're going" Available online at http://www.tomhume.org/stories/2002/02/04wapWhereWeveComeFrom-WhereWeAreW. . . , (18 pagers).

Goldman, Chris, "Browsing for Perfection", ARC Group in the Press, Feb. 1, 2001, Available online at http://www.aregroup.com/homepage.nsf/PRSARC/ar010201, (4 pages).

"Handheld Devices Markup Language (HDML) specifications", Apr. 11, 1997, Available on line at http://www.w3.org/TR/hdm120–3.html through http://www.w3.org/TR/hdm120–9.html, (33 pages).

Hinden, R., "Simple Internet Protocol Plus White Paper", Network Working Group, Oct. 1994, Available online at ftp://ftp.rfc–editor.org/innotes/rfc 1710.txt, (22 pages).

McCarthy, Vance, "Novell to llink wireless laptops, PDA's to LANs (portable computers, personal digital assistants, local area networks)" InfoWorld, Sep. 13, 1993, v15 n37 pq, (2 pages).

Schwartz, Barry K. and Stephen B. Weinstein, "Dual–Media Messaging Using Screen Telephones on the Telephone Network", Bell Communications Research, IEEE 1993, pp. 1183–1188, (6 pages).

Verjinski, Richard D., "PHASE, A Portable Host Access System Environment", Unisys Defense Systems, IEEE 1989, pp. 806–809, (4 pages).

Klements, Anders, Gerald Q. Maguire, Frank Reichert, and Mark, T. Smith, "MINT–A Mobile Internet Router", ILEE, 1993, pp. 70–74, (5 pages).

Perkins, Charles E. and Pravin Bhagwat, "A Mobile Networking System based on Internet Protocol"{, IEEE Personal Communications, First Quarter 1994, pp. 32–41, (10 pages).

Connolly, T., P. Amer, and P. Conrad,, "An Extension to TCP: Partial Order Service", Network Working Group, Nov. 1994, Available online at ftp://ftp.rfc–editor.org/in–notes/rfc 1698.txt, (14 pages).

Furniss, P., "Octet Sequences for Upper–Layer OSI to Support Basic Communications Applications", Networking Group, Oct. 1994, Available online at ftp://ftp.rfc–editor.org/in–notes/rfc1698.txt, (28 pages).

Graves, C., T. Butts, and M. Angel, "TN3270 Extensions for LUname and Printer Selection", Network Working Group, Jul. 1994, Available online at ftp://llp.rfc–editor.org/innotes/rfc161646.txt, (13 pages).

Klensin, J., N. Freed, M. Rose, E. Stefferud, and D. Crocker, "SMTP Service Extensions", Network Working Group, Feb. 1993, Available online at ftp://ftp.rfc–editor.org/in–notes/rfc1425txt, (10 pages).

Wang, Z., "EIP: The Extended Internet Protocol A Framework for Maintaining Backward Compatibility", Network Working Group, Nov. 1992, Available online at ftp://ftp.rfc–editor.org/in–notes/rfc1385.txt, (16 pages).

Gwinn, A., "Simple Network Paging Protocol–Version 2", Network Working Group, Jul. 1994, Available online at ftp://ftp.rfc–editor.org/in–notes/rfc1645.txt, (15 pages).

Braden, B., J. Postel, and Y. Rekhter, "Internet Architecture Extensions for Shared Media", Network Working Group, May 1994, Available online at ftp://ftp.rfc–editor.org/in–notes/rfc1620.txt, (18 pages).

Delgrossi, Luca, Christian Halstrick, Ralf Guido Herrtwich, and Heinrich Stüttgen, "HeiTP—A Transport Protocol for ST–II," IBM European Networking Center, IEEE 1992, pp. 1369–1373, (5 pages).

Tsang, P. W. M. and R. W. C. Wang, "Development of a Distributive Lighting Control System Using Local Operating Network," IEEE Transactions on Consumer Electronics, vol. 40, No. 4, Nov. 1994, (11 pages).

Adomeit, Reinhard and Bernhard Holtkamp, "A Reference Framework for Integrated POI/POS Systems," Fraunhofer Institute for Software Engineering and Systems Engineering, (4 pages).

Caneve, Maurizio, and Roberto Gagliardi, "A WAIS–Based Hypermedia Document System," (4 pages).

Caneve, Maurizio, and Roberto Gagliardi, "A WIAS–Based Hypermedia Document System," (4 pages).

Schmidt, Claudia, Burkhard Stiller, and Martina Zitterbart, "Towards Flexible Service–integrated Communication Subsystems," Jul. 1, 1994, (4 pages).

Plagemann, Thomas, Janusz Waclawczyk, and Bernhard Plattner, "Management of Configurable Protocols for Multimedia Applications," (4 pages).

"Frame relay attracts chains; networks at Kash N' Karry, Office Max (network communications protocol)," Chain Store Age Executive with Shopping Center Age, Dec. 1994 v70, (4 pages).

Cummings, Joanne, "What's Hot What's Not '95," Network World, Dec. 26, 1994/Jan. 2, 1995, (5 pages).

Aronin, Mindy, "XcelleNet launches fifth–generation RemoteWare 2.0 for remote and mobile applications," Business Wire, Nov. 28, 1994, (4 pages).

Baum, David, "Designing mobile applications (case studies of companies developing mobile programs)," InfoWorld, Nov. 28, 1994 v16 n48 p73, (7 pages).

Moeller, Michael, "Wireless standard to ease application portability; extensions will provide a common layer for CDPD, RAM, Ardis software," PC Week, Nov. 21, 1994 v11 n46 p1, (3 pages).

Petreley, Nicholas, Nancy Durlester, and Laura Wonnacott, "The interoperability headache: linking disperate clients and servers," InfoWorld, Nov. 15, 1993 v15 n46 p124, (12 pages).

Miscellaneous List of Article Abstracts, (50 pages).

Rescorla et al., "The Secure HyperText Transfer Protocol", Network Working Group, © Aug. 1999, (42 pages).

Berners–Lee et al., "HyperText Markup Language Specification—2.0", Nov. 29, 1994, Available online at http://marc.merlins.org/~merlin/htmlearn/html2.html., Aug. 21, 2002, (69 pages).

Raggett, Dave, "HyperText Markup Language Specification Version 3.0", Mar. 28, 1995, Available online at http://www.w3.org/MarkUp/html3/html3.txt., Aug. 21, 2002, (181 pages).

Merle et al., "Integration of heterogeneous environments: World Wide Web, Smart Card and Corba," Date Unknown, (16 pages).

"ProSolutions, Inc. ASP vs. CGI 'Active Server Pages (ASP) Technology'", E Business Solutions, © 1995–2002, Available online at http://www.prosolutionsinc.com/asp.htm., May 8, 2002, (2 pages).

Kirby et al., "Developing JDBC Servlet Applications", Dynamic Information Systems Corporation, Available online at http://www.disc.com/jdbeserv.html., May 8, 2002, (12 pages).

Pasian et al., "A Generalized Mosaic–to–SQL Interface with Extensions to Distributed Archives", Astronomical Data Analysis Software and Systems IV ASP Conference Series, Vol. 77, 1995, Available online at http://www.stsci.edu/stsci/meetings/adassIV/pasianf.html., May 7, 2002, (5 pages).

Ng, Jason, "GSQL—A Mosaic–SQL gateway", Dec. 1993, Available online at http://archive.ncsa.uiuc.edu/SDG/People/jason/pub/gsql/starthere.html., May 7, 2002, (16 pages).

Rasmussen, B. F., "WDB—A Web Interface to Sybase", Astronomical Data Analysis Software and Systems IV ASP Conference Series, vol. 77, 1995, Available online at http://www.stsci.edu/stsci/meetings/addasIV/rasmussenb.html., May 7, 2002, (7 pages).

Connolly, Daniel W., "Paul Burchard on HTML 2.0 FORMs", Jul. 11, 1994, Availabile online at http://lists.w3.org/Archives/Public/www–html/1994Jul/0014.html., Dec. 3, 2001, (6 pages).

Hackborn, Dianne, "Re: Java Applet element proposal", Jun. 8, 1995, Available online at http://ksi.cpsc.ucalgary.ca/archives/HTML–WG/html–wg–95q2.messages/1228.html., Nov. 1, 2001, (2 pages).

Kaye, Walter Ian, "Re: Protocol registry? (fwd. Java Applet element proposal)", Jun. 5, 1995, Available online at http://lists.w3.org/Archives/Public/www–html/1995Jun/0069.html., Aug. 14, 2001, (3 pages).

"The APP HTML Tag", Hot Java, Sun Microsystems, Inc., © 1995, Available online at Apr. 24, 2002, (2 pages).

Yourdon, Edward, "Java and the new Internet programming paradigm", Aug. 1996, Available online at http://www.javaworld.com/javaworld/jw–08–1996/jw–08–yourdonbook_p.html., Apr. 29, 2002, (20 pages).

Merckling et al., "Smart Card Introduction", Mar. 1994, Available online at http://www.opengroup.org/rfc/mirrorrfc/rfc57.0.txt., Mar. 1, 2001, (16 pages).

Bellovin et al., "Limitations of the Kerberos Authentication System", USENIX, 1991, (16 pages).

"Guideline for the Use of Advanced Authentication Technology Alternatives", Federal Information Processing Standards Publication 190, Sep. 28, 1994, Available online at http://www.itl.nist.gov/fipspubs/fip190.htm., Mar. 21, 2002, (49 pages).

"HTML + (Hypertext markup format)", Nov. 8, 1993, Available online at http://www.w3.org/MarkUp/HTMLPlus/htmlplus_2.html., Mar. 28, 2002, (89 pages).

Everhart, Craig, "Re: Interesting uses of networking", Jun. 11, 1990, Available online at http://www.cs.ucsd.edu/users/bsy/coke.history.txt., Sep. 17, 2002 (4 pages).

Kotanchik, J., "Kerberos and Two–Factor Authentication", Security Dynamics, Mar. 1994, (11 pages).

McLaughlin, L. III, ed., "Line Printer Daemon Protocol", Network Printing Working Group, Aug. 1990, Available online at http://www.ietf.org/rfc/rfc1179.txt., Sep. 17, 2002, (14 pages).

Gutfreund, Yechezkal–Shimon, "Mosaic Accessories", Jan. 26, 1994, Available online at file://C.:\WINDOWS/TEMP/WWW–Talk%20Jan–Mar%201994%20Mosaic%20Accessories.htm., Apr. 1, 2002, (8 pages).

Gessler et al., "PDAs as mobile WWW browsers", Date Unknown, Telecooperation Office, University of Karlsruhe, Available online at file://C:\WINDOWS\TEMP\gwpring\PDAs%20as%20mobile%20WWW%20browsers.htm., Mar. 28, 2002, (9 pages).

Malamud et al., "Principles of Operation for the TPC.INT Subdomain: Remote Printing—Technical Procedures", Dover Beach Consulting, Inc., Oct. 1993, (11 pages).

Louis, Tristan, "Java on the Menu: Causing Jitters?," Jun. 1995, Available online at http://www.tnl.net/who/bibliography/javajitters.asp., Apr. 29, 2002, (2 pages).

Allen, Terry, "Java Applet element proposal," Jun. 1, 1995, Available online at http://ksi.cpsc.ucalgary.ca/archives/HTML–WG/html–wg–95q2.messages/1119.html., Nov. 16, 2001, (4 pages).

"The Smart Card Cashes In", The Economist, Jan. 29, 1994 (2 pages).

| HTML + D Attributes | | Description |
|---|---|---|
| <FORM ACTION = "url" | | To/From Web Server URL |
| | FROM "file name" | From Terminal Local File |
| | TO PRINTER | To Local Printer |
| | TO "file name" | To Terminal Local File |
| | FROM SCR | From Smart Card Reader |
| | TO SCR | To Smart Card Reader |
| METHOD = "GET" | | Retrieve Data |
| | "POST" | Store Data |
| | "PAYMENT" | Directive to deliver INPUT data to a private Payment Network for authorization and settlement |
| | SQL <database name> | SQL statement database table |

| Attribute | Value | Description |
|---|---|---|
| <INPUT TYPE= | "text" | |
| | "password" | |
| | "checkbox" | |
| | "radio" | |
| | "submit" | |
| | "reset" | |
| NAME= | <field name> | |
| VALUE = | <initial value> | |
| CHECKED = | | |
| SIZE = | | |
| MAXLENGTH = | | |
| > | | |

| Attribute | HTML + D Value | Terminal Device |
|---|---|---|
| TYPE = | "MSRT1" | Mag Stripe Reader - Track 1 |
| | "MSRT2" | Mag Stripe Reader - Track 2 |
| | "KEY" | Terminal Command Keypad |
| | "PIN" | PIN Pad |
| | "BCW" | Bar Code Wand |
| | "MICR" | Check MICR Reader |
| | "AMT" | Dollar amount key input mask |
| | "INT" | Integer key input mask |
| | "LOCAL" | Input from Local Variable |
| | "AUTOSUBMIT" | Submit FORM to ACTION URL |
| NAME= | ip_address | Local Variable - Terminal's IP Address |
| | host_phone | Local Variable - Local Internet Access Phone Number |
| | tid | Local Variable - Terminal ID |
| | work_key | Local Variable - PIN encryption working key |
| | datetime | Local Variable - Date and time |
| | deposit_acct | Local Variable - Merchant Deposit Account |

FIG. 2

SQL Statements

The following SQL commands represent a subset of the entire command set that varies by database vendor.

| HTML+D Attributes | Description |
|---|---|
| SELECT *, field_name,_ | Request field_name (one or many) from a database table |
|     FROM =<table name>,_ | Database table name |
|     WHERE=<condition> | Conditional selection of data |
|         name = "constant" | |
|         name LIKE "constant" | |
|         name IN "constant" | |
|         AND | |
|         OR | |
|     ORDER=ASC | Request in ascending order |
|         DESC | _descending |
|         2 | _by2's |
|     GROUP=<name> | |
| INSERT TABLE=<table name> | Insert new data in database table |
|     VALUES="constants" | |
| UPDATE FROM | |
|     <table name> | Update field_name in database table |
|     SET=field_name="constant" | |
|     [ WHERE=<condition> ] | Update if WHERE clause is satisfied |
| DELETE FROM <table name> | Delete all columns that satisfy WHERE clause |
|     [ WHERE=<condition> ] | |
| CREATE TABLE<table_name> | Create database table |
|     PRIMARY KEY<name> | |

FIG. 3

1. <FORM ACTION=URL      METHOD= GET>
2. <FORM ACTION=URL      METHOD= POST>
3. <FORM ACTION=URL      METHOD= SQL <database_name>

FIG.12

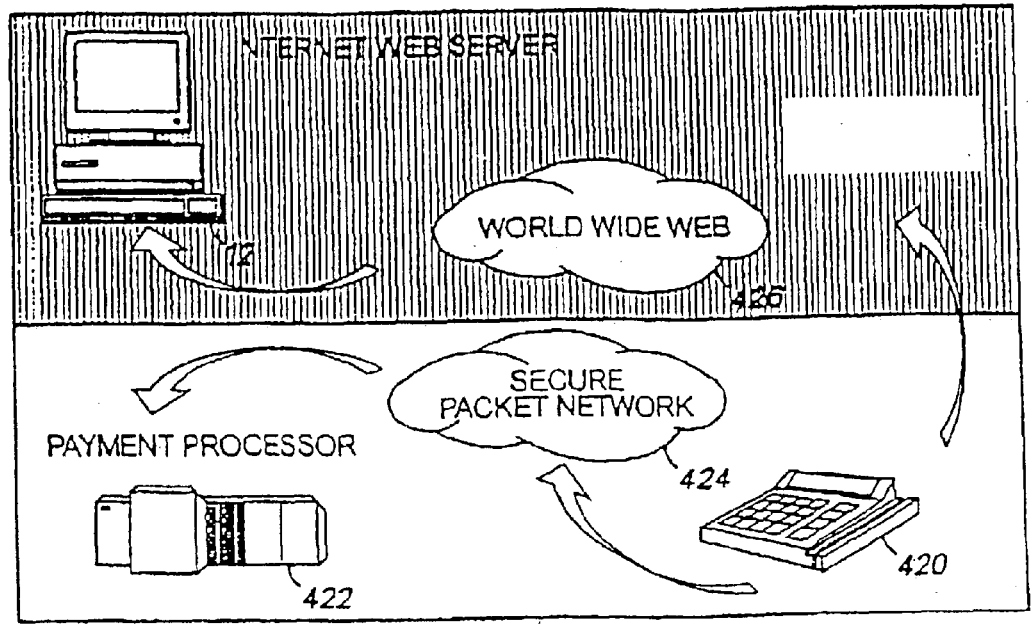

FIG.13A

<FORM ACTION=<filename>   METHOD=PAYMENT>
<INPUT TYPE=AUTOSUBMIT>
</FORM>

FIG.13B

<FORM ACTION=dsinet METHOD=PAYMENT>
<INPUT TYPE=LOCAL NAME=DEPOSIT_ACCT VALUE=123456890234567890>
<INPUT TYPE=AUTOSUBMIT>
</FORM>

FIG.13C

1.a. Transaction Request HTML+D

```
                                    500
<HTML>
<BODY>
<FORM ACTION=dbase_URL
    METHOD=SQL
        "BEGIN TRAN
        IF NOT EXISTS ( SELECT substring(account, 1, 20) FROM auth_table)
            BEGIN
                INSERT TABLE=log_table VALUES=(getdate(),tid, substring (account, 1,20) ,
                substring( account, 22, 4), amount)
                SELECT * FROM log_table WHERE trandate = getdate()
            END
            ELSE SELECT * FROM error_table WHERE error_no=1
            COMMIT TRAN">
<INPUT TYPE="LOCAL" NAME=tid>
ENTER ACCOUNT NUMBER:
<INPUT TYPE="MSRT2" SIZE=40 NAME=account>
ENTER AMOUNT
<INPUT TYPE="AMT" SIZE=8 NAME=amount>
<INPUT TYPE="AUTOSUBMIT">
</FORM>
</BODY>
</HTML>
```

1.b. Transaction Accepted Response

```
                                    510
<HTML>
<BODY>
<FORM ACTION=TO PRINTER METHOD=POST>
JUNE 1 1995          10:30AM        PURCHASE</P>
TERMINAL ID:                        999999999</P>
ACCOUNT NUMBER       9999999999999999999</P>
EXP DATE:                           99/99</P>
AMOUNT                              $9999.99</P>
AUTH NUMBER                         999999999</P>
<P>
---------------------------------</p>
        CUSTOMER SIGNATURE </p>
</FORM>
APPROVED:999999999</P>
</BODY>
</HTML>
```

1.c. Transaction Declined or Submit Error Response

```
                                    520
<HTML>
<BODY>
DECLINED<MESSAGE>
</BODY>
</HTML>
```

FIG.14

2.a. Transaction Request HTML+D
\550

```
<HTML>
<BODY>
<FORM ACTION=dbase_URL
METHOD=SQL "BEGIN TRAN
    IF NOT EXISTS ( SELECT substring(account, 1, 20) FROM auth_table)
    BEGIN
            INSERT TABLE=log_table VALUES=(getdate(),tid, substring( account, 1,20),
            substring( account, 22, 4), amount)
    END
    ELSE BEGIN
            SELECT * FROM error_table WHERE error_no=1
            RETURN
    END
    INSERT TABLE=order_table VALUES=( getdate(), cust_name,address,city, state, zip,
            part_code, unit_price, tax, ship_method, ship_chrg, unit_price + tax +
            ship_chrg, substring( account, 1, 20) ,substring( account, 22, 4))
    SELECT * FROM order_table WHERE trandate = getdate()
    COMMIT TRAN">
CUSTOMER NAME:
<INPUT TYPE="TEXT" SIZE=30 NAME=cust_name></p>
ADDRESS:
<INPUT TYPE="TEXT" SIZE=40 NAME=address></p>
CITY:
<INPUT TYPE="TEXT" SIZE=20 NAME=city></p>
STATE:
<INPUT TYPE="TEXT" SIZE=2 NAME=state>
ZIP:
<INPUT TYPE="TEXT" SIZE=10 NAME=address></p>
SCAN PART CODE:
<INPUT TYPE="BCW" SIZE=9 NAME=part_code></p>
ENTER UNIT PRICE:
<INPUT TYPE="AMT" SIZE=8 NAME=unit_price></p>
TAX:
<INPUT TYPE="AMT" SIZE=5 NAME=tax></p>
SHIPPING METHOD:
<INPUT TYPE="TEXT" SIZE=10 NAME=ship_method></p>
SHIPPING AMOUNT:
<INPUT TYPE="AMT" SIZE=5 NAME=ship_chrg></p>
SLIDE CARD:
<INPUT TYPE="MSRTZ" SIZE=40 NAME=account></p>
<INPUT TYPE="SUBMIT">
</FORM>
</BODY>
</HTML>
```

FIG. 15A 2.b. Transaction Accepted Response

```
<HTML>                                      555
<BODY>
<FORM ACTION=TO PRINTER METHOD=POST>
ORDER # 9999999999 APPROVED</p>
JUNE 1 1995      10:30AM      PURCHASE</P>
TERMINAL ID:                 999999999</P>
NAME: XXXXXXXXXXXXXXXXXXXXXXXXXXXXXXXX</p>
ADDRESS:</p>
XXXXXXXXXXXXXXXXXXXXXXXXXXXXXXXXXXXX</p>
CITY: XXXXXXXXXXXXXXXXXXXXXX</p>
STATE: XX              ZIP:XXXXXXXXX</p>
ACCOUNT NUMBER:    9999999999999999999</p>
EXP DATE:                       99/99</p>
PART CODE:                  999999999</p>
UNIT PRICE:                 $9999.99</p>
SHIP METHOD:XXXXXXX CHARGE   $9999.99</p>
TOTAL AMOUNT:               $9999.99</p>
AUTH NUMBER                 999999999</p>
</p>

-------------------------------</p>
           CUSTOMER SIGNATURE</p>

</FORM>
</BODY>
</HTML>
```

2.c. Transaction Declined or Submit Error Response

```
<HTML>                                      560
<BODY>
DECLINED <error code>
</BODY>
</HTML>
```

FIG. 15B 3.a. Transaction Request HTML+D

```
<HTML>
<BODY>
<FORM ACTION=dbase_URL
METHOD SQL
    "INSERT TABLE=order_table VALUES=( getdate(), cust_name,address,city, state, zip,
        part_code, unit_price, tax, ship_method, ship_chrg,unit_price + tax +
        ship_chrg, substring( account, 1, 20) ,substring( account, 22, 4))
    SELECT * FROM order_table WHERE trandate = getdate()">
<INPUT TYPE="LOCAL" NAME=tid>
CUSTOMER NAME:
<INPUT TYPE="TEXT" SIZE=30 NAME=cust_name></p>
ADDRESS:
<INPUT TYPE="TEXT" SIZE=40 NAME=address></p>
CITY:
<INPUT TYPE="TEXT" SIZE=20 NAME=city><p>
STATE:
<INPUT TYPE="TEXT" SIZE=2 NAME=state>
ZIP:
<INPUT TYPE="TEXT" SIZE=10 NAME=address></p>
ENTER PART CODE:
<INPUT TYPE="TEXT" SIZE=10 NAME=part_code></p>
ENTER UNIT PRICE:
<INPUT TYPE="AMT" SIZE=8 NAME=unit_price></p>
TAX:
<INPUT TYPE="AMT" SIZE=5 NAME=tax></p>
SHIPPING METHOD:
<INPUT TYPE="TEXT" SIZE=10 NAME=ship_method></p>
SHIPPING AMOUNT:
<INPUT TYPE="AMT" SIZE=5 NAME=ship_chrg></p>
<INPUT TYPE="SUBMIT" >
</FORM>
</BODY>
</HTML>
```

FIG.16A 3.b. Transaction Accepted Response

```
<HTML>
<BODY>
<FORM ACTION=TO PRINTER METHOD=POST>
ORDER # 9999999999 APPROVED</p>
JUNE 1 1995       10:30AM         PURCHASE</P>
TERMINAL ID:                      999999999</P>
NAME: XXXXXXXXXXXXXXXXXXXXXXXXXXXXXXXX</p>
ADDRESS:</p>
XXXXXXXXXXXXXXXXXXXXXXXXXXXXXXXXXXXX</p>
CITY: XXXXXXXXXXXXXXXXXXXXXXXX</p>
STATE: XX              ZIP:XXXXXXXXXX</p>
PART CODE:                        999999999</p>
UNIT PRICE:                       $9999.99</p>
SHIP METHOD:XXXXXXX CHARGE:       $9999.99</p>
TOTAL AMOUNT:                     $9999.99</p>
</FORM>
<FORM ACTION=<file_name> METHOD=PAYMENT>
<INPUT TYPE=AUTOSUBMIT>
</FORM>
</BODY>
</HTML>
```

3.c. Transaction Declined or Submit Error Response

```
<HTML>
<BODY>
DECLINED <error code>
</BODY>
</HTML>
```

FIG. 16B 4.a. Transaction Request HTML+D

```
<HTML>
<BODY>
<FORM ACTION=SCR1 METHOD=POST>
<INPUT TYPE="LOCAL" NAME=tid>
SLIDE CARD:
<INPUT TYPE="MSRTZ" SIZE=40 NAME=track2>
ENTER AMOUNT:
<INPUT TYPE="AMT" SIZE=8 NAME=amount>
<INPUT TYPE="LOCAL" NAME=work_key>
<INPUT TYPE="AUTOSUBMIT">
</FORM>
</BODY>
</HTML>
```

4.b. Transaction Accepted HTML+D

```
<HTML>
<BODY>
<FORM ACTION=TO PRINTER METHOD=POST>
DATE:99/99/99                    TIME:9999A</P>
ACCOUNT NUMBER    9999999999999999999</p>
EXP DATE                             99/99</p>
AMOUNT:                        $9999.99</p>
AUTH NUMBER             999999999</p>
</FORM>
APPROVED:999999999</P>
</BODY>
</HTML>
```

4.c. Transaction Declined or Submit Error Response

```
<HTML>
<BODY>
DECLINED <error code>
</BODY>
</HTML>
```

FIG.17A

5.a. Transaction Request HTML+D

```
<HTML>
<BODY>
<FORM ACTION=SCR2 METHOD=POST>
<INPUT TYPE="LOCAL" NAME=tid>
ENTER PIN:
<INPUT TYPE="PASSWORD" SIZE=4 NAME=pin>
ENTER AMOUNT:
<INPUT TYPE="AMT" SIZE=8 NAME=amount>
<INPUT TYPE="LOCAL" NAME=work_key>
<INPUT TYPE="AUTOSUBMIT">
</FORM>
</BODY>
</HTML>
```

5.b. Transaction Accepted HTML+D

```
<HTML>
<BODY>
<FORM ACTION=TO PRINTER METHOD=POST>
DATE:99/99/99                TIME:9999A</P>
ACCOUNT NUMBER     9999999999999999999</P>
  EXP DATE:                        99/99</P>
  AMOUNT                      $9999.99</P>
  AUTH NUMBER              999999999</P>
</FORM>
APPROVED:999999999</P>
</BODY>
</HTML>
```

5.c. Transaction Declined or Submit Error Response

```
<HTML>
<BODY>
DECLINED <error code>
</BODY>
</HTML>
```

FIG. 17B 6.a. Transaction Request HTML+D

```
<HTML>
<BODY>
<FORM ACTION=host_URL METHOD=POST>
<INPUT TYPE="LOCAL" NAME=id>
SLIDE CARD
<INPUT TYPE="MSRT2" SIZE=40 NAME=track2>
<INPUT TYPE="PIN" SIZE=4 NAME=pin>
ENTER AMOUNT:
<INPUT TYPE="AMT" SIZE=8 NAME=amount>
<INPUT TYPE="AUTOSUBMIT">
</FORM>
</BODY>
</HTML>
```

6.b. Transaction Accepted HTML+D

```
<HTML>
<BODY>
<FORM ACTION=TO PRINTER METHOD=POST>
DATE:99/99/99                TIME:9999A</P>
TERMINAL ID:                  999999999</P>
ACCOUNT NUMBER    9999999999999999999</P>
EXP DATE:                          99/99</P>
AMOUNT                         $9999.99</P>
AUTH NUMBER                 999999999</P>
</FORM>
APPROVED:999999999</P>
</BODY>
</HTML>
```

6.c. Transaction Declined or Submit Error Response

```
<HTML>
<BODY>
DECLINED <error code>
<INPUT TYPE="LOCAL" NAME=work_key VALUE="9999999999999999">
</BODY>
</HTML>
```

FIG. 18

7.a. Transaction Request HTML+D

```
<HTML>
<BODY>
<FORM  ACTION=dbase_URL
       METHOD=SQL
            "IF EXISTS ( SELECT account FROM check_table)
                 SELECT * FROM check_table WHERE account = DDAaccount
             ELSE SELECT * FROM error_table WHERE error_no=1">
<INPUT TYPE="LOCAL" NAME=tid>
SCAN CHECK:
<INPUT TYPE="MICR" SIZE=20 NAME=account>
ENTER AMOUNT
<INPUT TYPE="AMT" SIZE=8 NAME=amount>
<INPUT TYPE="AUTOSUBMIT">
</FORM>
</BODY>
</HTML>
```

7.b. Transaction Accepted Response

```
<HTML>
<BODY>
<FORM ACTION=TO PRINTER METHOD=POST>
DATE:99/99/99                    TIME:9999</P>
 TERMINAL ID:                    99999999</P>
ACCOUNT NUMBER       9999999999999999999</P>
AMOUNT                        $9999.99</P>
AUTH NUMBER                   99999999</P>
</FORM>
APPROVED:99999999</P>
</BODY>
</HTML>
```

7.c. Transaction Declined or Submit Error Response

```
<HTML>
<BODY>
DECLINED <error code>
</BODY>
</HTML>
```

FIG.19

8.a. Transaction Request HTML+D

```
<HTML>
<BODY>
<FORM ACTION=dbase_URL
      METHOD=SQL
      "BEGIN TRAN
            IF NOT EXISTS ( SELECT substring(account,51,20) FROM auth_table)
            BEGIN
                  SELECT cur_bal FROM cust_tbl WHERE substring(account,51,20)=account
                  SELECT amount = amount - (points/.01)
                  SELECT cur_bal = cur_bal + (amount*.01)
                  UPDATE TABLE=cust_tbl VALUES=(getdate(), account, cur_bal - points)
                  SELECT * FROM log_table WHERE trandate = getdate()
                  INSERT TABLE=log_table VALUES=(getdate(), tid, substring(account,51,20),
                  substring( account, 72, 4), amount)
            END
      ELSE SELECT * FROM error_table WHERE error_no=1"
      COMMIT TRAN">
<INPUT TYPE="LOCAL" NAME=tid>
ENTER ACCOUNT NUMBER:
<INPUT TYPE="MSRT1" SIZE=90 NAME=account>
ENTER AMOUNT
<INPUT TYPE="AMT" SIZE=8 NAME=amount>
REDEEM POINTS?
<INPUT TYPE="INT" SIZE=6 NAME=points>
<INPUT TYPE="AUTOSUBMIT">
</FORM>
</BODY>
</HTML>
```

8.b. Transaction Accepted Response

```
<HTML>
<BODY>
<FORM ACTION=TO PRINTER METHOD=POST>
JUNE 1 1995      10:30AM            PURCHASE</P>
TERMINAL ID:                        999999999</P>
ACCOUNT NUMBER   9999999999999999999</P>
EXP DATE                            99/99</P>
AMOUNT                              $9999.99</P>
AUTH NUMBER                         999999999</P>
</p>
-------------------------------- </p>
             CUSTOMER SIGNATURE</p>
</p>
THANK YOU!</p>
XXXXXXXXXXXXXXXXXXXXXXXXXXXXXXXXXXX</p>
POINTS REDEEMED:                    999999</p>
POINTS EARNED:                      999999</p>
CURRENT POINT BALANCE:              999999</p>
</FORM>
APPROVED:999999999</P>
</BODY>
</HTML>
```

8.c. Transaction Declined or Submit Error Response

```
<HTML>
<BODY>
DECLINED <MESSAGE>
</BODY>
</HTML>
```

FIG. 20

9.a. Transaction Request HTML+D

```
<HTML>
<BODY>
<FORM ACTION=dbase_URL
      METHOD=SQL
              "SELECT fields FROM table WHERE condition">
<INPUT TYPE="LOCAL" NAME=id>
ENTER SEARCH TABLE NAME:
<INPUT TYPE="TEXT" SIZE=10 NAME=table>
ENTER SEARCH FIELD NAMES:
<INPUT TYPE="TEXT" SIZE=100 NAME=fields>
ENTER SEARCH CONDITION:
<INPUT TYPE="TEXT" SIZE=50 NAME=condition>
<INPUT TYPE="AUTOSUBMIT">
</FORM>
</BODY>
</HTML>
```

9.b. Transaction Response

```
<HTML>
<BODY>
<FORM ACTION=TO PRINTER METHOD=POST>
FIELD1   FIELD2   FIELD3   ----   FIELDN    </p>
_____   _____   _____          _____    </p>
XXXXX    XXXXX    XXXXX           XXXXX     </p>
XXXXX    XXXXX    XXXXX           XXXXX     </p>
  .
  .
XXXXX    XXXXX    XXXXX           XXXXX     </p>
</FORM>
</BODY>
</HTML>
```

FIG. 21

10.a Transaction Request HTML+D

```
<HTML>
<BODY>
<FORM ACTION=dbase_URL
      METHOD=SQL
    * INSERT TABLE=log_table VALUES=( getdate(), tid, gross_sales, opn_chks, voids,
      emp_disc, mgr_disc, vip_card, man_over, coupons, sales_tax, c_dep1, c_dep2,
      c_dep3, c_dep4, chg_fund,cc_dep, batch_no, chrg_sales, paid_outs, co_sales,
      cc_sales, te_sales, gross_sales - opn_chks - voids - emp_disc - mgr_disc - vip_card-
      man_over - coupons - sales_tax, gross_sales - opn_chks - voids -
      emp_disc - mgr_disc - vip_card - man_over - coupons - c_dep1 - c_dep2 -
      c_dep3 - c_dep4 - chg_fund - cc_dep - batch_no - chrg_sales - paid_outs)
      SELECT * FROM log_table WHERE trandate = getdate()">
<INPUT TYPE="LOCAL" NAME=tid>
ENTER GROSS SALES:
<INPUT TYPE="AMT" SIZE=8 NAME=gross_sales>
ENTER OPEN CHECKS:
<INPUT TYPE="INT" SIZE=7 NAME=opn_chks>
ENTER VOIDS:
<INPUT TYPE="INT" SIZE=7 NAME=voids>
ENTER EMP DISCOUNTS:
<INPUT TYPE="INT" SIZE=7 NAME=emp_disc>
ENTER MGR DISCOUNT:
<INPUT TYPE="INT" SIZE=7 NAME=mgr_disc>
ENTER VIP CARD:
<INPUT TYPE="INT" SIZE=7 NAME=vip_card>
ENTER MANUAL OVERRINGS:
<INPUT TYPE="INT" SIZE=7 NAME=man_over>
ENTER COUPONS:
<INPUT TYPE="INT" SIZE=7 NAME=coupons>
ENTER SALES TAX:
<INPUT TYPE="AMT" SIZE=8 NAME=sales_tax>
ENTER CASH DEPOSIT 1:
<INPUT TYPE="AMT" SIZE=8 NAME=c_dep1>
ENTER CASH DEPOSIT 2:
<INPUT TYPE="AMT" SIZE=8 NAME=c_dep2>
ENTER CASH DEPOSIT 3:
<INPUT TYPE="AMT" SIZE=8 NAME=c_dep3>
ENTER CASH DEPOSIT 4:
<INPUT TYPE="AMT" SIZE=8 NAME=c_dep4>
ENTER CHANGE FUND:
<INPUT TYPE="AMT" SIZE=8 NAME=chg_fund>
```

FIG.22A

```
ENTER CC DEPOSIT:
<INPUT TYPE="AMT" SIZE=8 NAME=cc_dep>
ENTER BATCH #:
<INPUT TYPE="INT" SIZE=3 NAME=batch_no>
ENTER CHARGE SALES:
<INPUT TYPE="AMT" SIZE=8 NAME=chrg_sales>
ENTER PAID OUTS:
<INPUT TYPE="INT" SIZE=8 NAME=paid_outs>
ENTER CARRY OUT SALES:
<INPUT TYPE="AMT" SIZE=8 NAME=co_sales>
ENTER CREDIT CARD SALES:
<INPUT TYPE="AMT" SIZE=8 NAME=cc_sales>
ENTER TAX EXEMPT SALES:
<INPUT TYPE="AMT" SIZE=8 NAME=te_sales>
<INPUT TYPE="AUTOSUBMIT">
</FORM>
</BODY>
</HTML>
```

10.b. Transaction Response

```
<HTML>
<BODY>
<FORM ACTION=TO PRINTER METHOD=POST>
JUNE 1 1995      10:30AM        DAILY REPORT</P>
TERMINAL ID:                    999999999</P>
GROSS SALES                     999999.99</P>
VOIDS                    99      99999.99</P>
EMP DISCOUNTS            99      99999.99</P>
MANAGER DISCOUNTS        99      99999.99</P>
VIP CARD                 99      99999.99</P>
COUPONS                  99      99999.99</P>
MANUAL OVERRINGS         99      99999.99</P>
SALES TAX                       999999.99</P>
CASH DEPOSIT 1                  999999.99</P>
CASH DEPOSIT 2                  999999.99</P>
CASH DEPOSIT 3                  999999.99</P>
CASH DEPOSIT 4                  999999.99</P>
CASH DEPOSIT 5                  999999.99</P>
CHANGE FUND                     999999.99</P>
CC DEPOSIT              999     999999.99</P>
CHARGE SALES                    999999.99</P>
PAID OUTS                99      99999.99</P>
CARRY OUT SALES                 999999.99</P>
CREDIT CARD SALES               999999.99</P>
TAX EXEMPT SALES                999999.99</P>
-----------------------------------</P>
NET SALES                        9999999</P>
OVER/SHORT                       9999999</P>
</FORM>
</BODY>
</HTML>
```

FIG.22B

11.a. Transaction Request HTML+D
```
<HTML>
<BODY>
<FORM ACTION=MAIL TO: mail_to>
 ENTER MAIL ADDRESS:
<INPUT TYPE="TEXT" SIZE=20 NAME=mail_to>
ENTER MESSAGE:
<INPUT TYPE="TEXT" SIZE=100>
<INPUT TYPE="AUTOSUBMIT">
</FORM>
</BODY>
</HTML>
```
FIG. 23
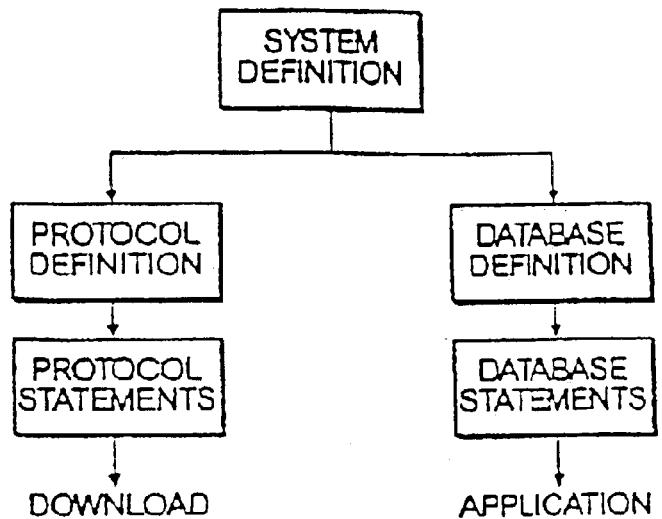
FIG. 24A
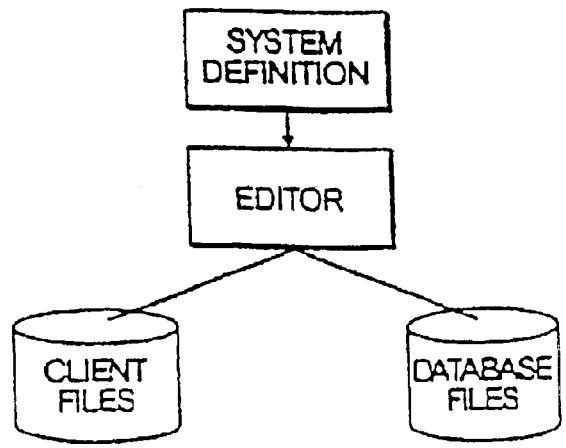
FIG. 24B

SYSTEM AND METHOD FOR ENABLING TRANSACTIONS BETWEEN A WEB SERVER AND AN AUTOMATED TELLER MACHINE OVER THE INTERNET

This application is a continuation of application Ser. No. 10/213,959, filed on Aug. 7, 2002 now U.S. Pat. No. 6,684,269, which is a continuation application Ser. No. 10/100,347, filed on Mar. 18, 2002 now U.S. Pat. No. 6,694,387, which is a continuation of application Ser. No. 09/907,076, filed on Jul. 17, 2001 now U.S. Pat. No. 6,745,259, which is a continuation of application Ser. No. 09/314,266, filed on May 18, 1999 (now U.S. Pat. No. 6,366,967), which is a continuation of application Ser. No. 08/995,123 filed Dec. 19, 1997 (now U.S. Pat. No. 5,905,908), which is a continuation of application Ser. No. 08/493,772 filed Jun. 22, 1995 (now U.S. Pat. No. 5,742,845).

FIELD OF THE INVENTION

This invention relates to data transaction systems, and more particularly, to data transaction systems using non-standard input/output devices.

BACKGROUND OF THE INVENTION

Data transaction systems which communicate with a plurality of remote terminals to transfer information used to complete a transaction or compile a database are well known. Typically, such systems include a central transaction processing system which may maintain a database of information such as customer or consumer data. Exemplary information in such a database may include customer identification, customer account numbers, credit limits and/or account balances from which a customer may draw. The central transaction processing system is typically coupled to a plurality of remote transaction or data input terminals. Transaction computers may include special purpose devices such as automatic teller machines (ATMs), point of sale (POS) terminals, credit card terminals, and screen phone terminals. Screen phone terminals are devices which integrate a telephone with an ATM-like device and possibly a magnetic card swipe reader. Data input terminals may include personal computers (PCs) interfaced to data collection devices or special purpose data collection terminals or monitors.

In these known data transaction systems, a user usually initiates a transaction by requesting access to funds in an account or from a credit line maintained by the central processing system. The request is transmitted to the central processing system which performs a verification to determine whether the user is a valid user of the system, has an account within the system, and that the amount of the transaction is within the limits of the consumer's credit line or that the user has the requested funds available in an existing account monitored by the central processing system. The central processing system then transmits authorization for or denial of the transaction to the remote terminal. In response to the message from the central processing system, the remote terminal dispenses cash (for an ATM) or the merchant provides the goods being purchased to the user if the authorization message indicates that the consumer's funds will be transferred to the merchant's account. Similar communication exchanges occur in data systems where electronic documents and other information are provided to a central site for compilation or processing. Consequently, this background discussion applies to all such transaction and data systems. Though the remainder of the discussion is directed to transaction systems, the reader should appreciate that the comments also apply to data systems as well.

The remote terminals may be coupled to the central processing system in several ways. For example, in some ATM systems, the ATMs are coupled to the central processing system through dedicated telephone or other data communication lines. These systems are preferred because they provide a relatively high degree of security since the dedicated data line coupling the central processing system to the ATM is not generally accessible by members of the public. The physical security of the dedicated data line is, however, expensive because no other traffic may utilize the line. Thus, the cost of leasing the dedicated line to an ATM with relatively low volumes of transactions may yield a high communication cost per transaction.

In an effort to reduce the communication cost per transaction, some transaction or data systems utilize telephone lines through a publicly-switched telephone network (PSTN) which may be accessed by other members of the public. Specifically, devices such as credit card terminals and screen phone terminals typically include a modem which converts the digital messages of the remote terminal into frequency modulated analog signals which may be transmitted over telephone lines to a modem at the central processing system. In other systems, the terminal may communicate digital data directly over ISDN lines of the PSTN to the central processing system. This line of communication between a remote terminal and the central processing system is performed by having the remote terminal dial a telephone number associated with the central processing system to establish communication with the central processing system. This type of communication path is relatively secure because the switching networks for the communication traffic through the PSTN are not readily accessible by the public and during the course of the financial transaction, only the central processing system and remote terminal are on the line.

Regardless of the communication method used to couple the central processing system to the remote terminals, the protocol and data formats used between the devices is typically proprietary. That is, the operator of each financial transaction system designs its own protocol and data message format for communication with the processor at the central site or generates a variant within a standard such as those established by the ANSI committee or the like for such communication. As a result, the remote terminals must include software that supports each operator's protocol and message formats in order to be compatible with an operator's central site. For example, application software in a credit terminal such as the TRANZ330, TRANZ380, or OMNI390 manufactured by VeriFone implement one or more of the communication protocols and formats for National Data Corporation (NDC), VISANET, MASTERCARD, BUYPASS, and National Bancard Corporation (NaBANCO) system processors in order to support transactions with the most popular transaction centers. Thus, the communication software absorbs a significant amount of terminal resources which could be used to support other terminal operations.

A related problem arises from the expanding home banking market. A customer of home banking system typically uses a screen phone terminal or a personal computer (PC) having a modem to establish communication through a PSTN to a central transaction processing system. Again, the operator of the central processing system must provide information regarding the data message formats for communicating with the central processing system to a vendor of software for the home banking terminals or must provide that software to its customers. As a result, home banking customers must purchase software to communicate with each banking system of which the customer wants to be a member. This cost and the need to install additional communication programs may make some consumers reluctant to be a member of more than one banking system or to change banking systems.

A communication system becoming increasingly popular and which provides standardized communication is the Internet. The Internet is an open network of networks which communicate through a variety of physical communication devices such as telephone lines, direct communication lines, and the like. Each network is coupled to the main Internet network for communication through a host computer supporting a TCP/IP router or bridger. The host computer typically includes a program, frequently called a Web server, which acts as a gateway to resources at the host computer which may be resident on the host computer or a network coupled to the host computer. Each server has an address identifying the location of the resources available through the Web server. The router recognizes communication for the server and directs the message to the server or it recognizes that the communication should be forwarded to another server. As a result, communication within the Internet may be point-to-point, but more likely, the communication path is a somewhat circuitous one with the information passing through the routers of multiple servers before reaching its final destination.

A number of message protocols and formats have been developed for the Internet. The physical communication protocol and data message format is the Transport Control Protocol/Internet Protocol (TCP/IP). The TCP/IP protocol involves multiple layers of encapsulating headers containing communication information which are used to provide byte streams or datagram communications to computers on the networks coupled to the Internet. Encapsulated within TCP/IP headers are protocols which are used to format the data messages or transfer data from one computer to another computer coupled to the Internet. These protocols include File Transfer Protocol (FTP), Simple Mail Transfer Protocol (SMTP), Post Office Protocol (POP), Telnet, and Hyper Text Transport Protocol (HTTP). The advantage of these protocols is that each provides a standardized communication format for transferring information between computers on the Internet. These protocols are typically called open system protocols as they are publicly known and may be utilized by any programmer to develop programs for communicating with another computer coupled to the Internet. These non-proprietary protocols have contributed to the acceptance of using the Internet as an open network for coupling computer networks together.

While the Internet provides an open network for computer communication with publicly accessible protocols and formats, the Internet suffers from a number of limitations which preclude its effective use as a transaction or data system which uses non-standard I/O terminals and devices. First, circuitous communication presents a number of security issues for such a system. For example, a Web server could incorporate a router which examines the address of each message coming through it and upon recognizing an address associated with a central transaction processing system copy the data message for the unauthorized retrieval of customer-sensitive information such as account numbers and personal identification numbers (PINs) which may be contained in the message.

A second limitation of open networks such as the Internet is that communication on such networks is only supported for computers acting as servers or clients. Specifically, all of the protocols and formats are constructed for standard input/output (I/O) operations for a PC terminal. That is, text information is directed to a standard monitor screen, user input is expected from a standard keyboard, and files are transferred to standard peripherals such as a hard disk or diskette drive. Especially absent is the ability in open network protocols for communication with devices that only use communication interfaces such as RS-232C. As a result, communication over the Internet is primarily performed with standard PCs through network communication methods and interfaces.

This presents a number of problems for home banking or for interfacing non-standard I/O terminals such as credit card terminals or screen phones to open networks such as the Internet either directly or through a PC. Generally, non-standard I/O devices are devices which interface to a PC through a port not normally used for networks, such as a RS-232C port, or are devices which have limited input and output capabilities such as small screen displays or ten keypads. These devices are not supported on the Internet because servers use protocols that communicate with PCs supporting standard QWERTY keyboards and standard monitors. Consequently, users are limited to entering account numbers and the like through a keyboard of a PC-like device for processing at a central transaction processing system. To request a transaction, one need only have a person's credit card account number. If the credit card number had to be input through a magnetic card reader, unauthorized access to a customer's account would be less likely since physical possession of the credit card would be required to initiate the transaction.

Another limitation of the standard I/O devices currently supported by the open network protocols is the lack of encryption. For example, PIN pads, which are typically incorporated in ATMs, automatically encrypt in hardware a PIN entered by a user. Such devices typically encrypt the number by implementing a data encryption standard (DES) algorithm in hardware before the PIN is transmitted or stored. When a standard keyboard is used to input the PIN, no hardware encryption is performed and, as a result, an unencrypted copy of the PIN is provided to the memory of the PC. Storage of unencrypted PINs is in contravention of current banking regulations. If PIN pads could be read via Internet protocols, then such a lapse in PIN security would be less likely to occur.

Another I/O device not supported on open networks are smart cards which are increasing in use. Smart cards include a processor and memory in which information regarding the amount of funds in a particular account, a transaction history, account numbers, and customer data may be stored. The card may be read through a smart card reader which is a computer having a processor and memory but usually provided with non-QWERTY keypads and limited displays. A transaction processor may validate a card owner through a PIN provided through a keypad, determine the amount of money remaining on the card and debit the card itself for a transaction amount by communicating with the smart card reader with one of the proprietary protocols discussed above. Such information is not readily obtainable by the owner of the card and so cannot be entered through a keyboard or the like. Smart card readers are non-standard devices which may be coupled to a PC through a COMM1 or COMM2 port. However, none of the standard protocols and message formats for open network communications currently provide I/O operations for such devices.

All systems which attempt to provide three party communication to execute an electronic transaction suffer from a number of limitations which present risks greater than those in a normal transaction performed at the point of sale. In a typical point of sale (POS) transaction, the consumer hands a debit or credit card to a merchant's agent who may examine the card for IS security markings such as holograms, watermarks, or a cardholder signature. The agent then places the card into a reader for acquiring information from the card and, in some cases, have the consumer enter a PIN into a PIN entry device which encrypts the PIN in a hardware implemented scheme. If the PIN is entered, it is transmitted with the information from the card to a processing center, typically in one of the formats discussed above, under a X.25 protocol or the like. The processing center returns an authorization granted or denied message. The reader typically has a printer coupled to it through an RS-232C port or the like and a purchase agreement is printed. The consumer signs the agreement, the merchant's agent may verify the signature, and the merchant retains an original of the agreement and the consumer a copy. In this scenario, the merchant has initiated the communication to the processing center. The safeguards noted above permit the processing center to charge a merchant a lower processing fee than when a consumer initiates a transaction. Consumer initiated transactions present a greater risk because the consumer provides an agent an account number in a telephone conversation or non-encrypted DTMF transmission. Thus, there is no card inspection, signature verification, or PIN verification. As a result, such transactions are limited to credit cards because debit cards require that the cardholder be present to enter a PIN into an appropriate PIN entry device.

What is needed is a system that permits consumers remote from a merchant to order goods and present payment in a secured manner so the merchants risk and processing costs, as well as a cardholder's exposure to fraud, is reduced. What is needed is a way for a processing center to communicate through an open network with non-standard I/O devices such as credit card terminals, personal digital assistants, and screen phone terminals or with non-standard I/O devices coupled to the open network through a PC or the like. What is needed is a transaction or data system which utilizes an open network such as the Internet to support electronic transactions or data compilation in a secure manner without undue limitation as to the devices with which communication may be made.

SUMMARY OF THE INVENTION

The present invention provides transaction and data systems which may be implemented on an open network such as the Internet. The system comprises a server for communicating in an open network protocol and a plurality of input/output (I/O) devices coupled to the server through an open network, the I/O devices communicating with the server in the extended open network protocol that supports communication with non-standard I/O devices over the open network. The system of the present invention provides a server with the capability of communicating with a number of I/O devices useful in transaction and data systems which heretofore have been unsupported on an open network system such as the Internet.

The system of the present invention is implemented by extending present open network communication protocols and data message formats to communicate with non-standard I/O devices either coupled to an open network as a client or coupled to an open network through a client, such as a PC, credit card terminal, screen phone, or PDA. That is, commands which are compatible with the communication schema of a presently-implemented protocol for the Internet are used and additions are made to commands implemented within the control structure of that existing protocol to support non-standard I/O device communication. At the server, the extended protocol is further supported by a common gateway interface (CGI) which converts the communication from a non-standard I/O device to a format which is compatible with a transaction or data application program which may be executed on the server or a computer coupled to the server. In this manner, the CGI permits the processing of the extended capability commands to be segregated from the communication functions performed by the server.

Preferably, the server and the I/O devices communicate through an Internet protocol and most preferably, the Hyper Text Transport Protocol (HTTP), to exchange data between an application program and non-standard I/O devices over an open network. Although HTTP is the preferred protocol used to implement the present invention, other protocols such as Telnet or SMTP, for example, may also be extended in a similar manner. Specifically, the HTTP protocol is expanded to communicate with printers, magnetic card readers, credit card terminals, smart card readers, check readers, PIN pads, bar-code readers, PDAs, or the like, and includes a command which instructs a non-standard I/O device to disconnect from the open network and re-couple to a transaction processing system to transfer funds from a consumer account to a merchant account through a PSTN or dedicated data line. By using these extended capability commands within HTTP, a processing system may operate on an open network such as the Internet and communicate with transaction or other data I/O devices which have not previously been able to couple to such open networks. Such a system may be used to execute a transaction between a consumer and a merchant so the merchant receives remittance information in a timely manner. The system permits the consumer to initiate a transaction and order from a merchant and then use a more secure link supported by PIN entry devices or the like to reduce the risk of fraud for the transaction.

Because the server may communicate through such open networks with non-standard I/O devices, the transaction or data processing system is available for the ever-expanding market available through the Internet. Such a system is able to communicate with non-standard I/O devices in myriad locations such as retail establishments or in consumers' homes. For example, a consumer may utilize the standard capability of an Internet protocol to communicate with a server that provides information regarding services or goods for sale over the Internet and then consummate a sales transaction by using the extended capability of the Internet protocol. Such a home consumer could provide transaction data through a smart card reader coupled to a COMM1 or COMM2 port of a PC. A database program executing at the server for the central processing site may accept product ordering information from a non-standard keypad or touch screen associated with a screen phone terminal at the remote site and then communicate with the smart card reader to consummate the transaction. Such a transaction system requires that the consumer have physical possession of the smart or credit card and not simply knowledge of the account number. Likewise, the server would be able to communicate with a PIN pad or the like to ensure the hardware encryption of PINs and other data before it is transmitted to the server site. Such a system is less susceptible to consumer fraud.

Another feature of the present invention is a PAYMENT command implemented in the extended Internet protocol that directs a non-standard I/O device or a PC interfaced with such devices to communicate with a transaction processor through an alternative communication link. In one form, the PAYMENT command is used by a merchant terminal to submit a consumer's account number with a merchant deposit account number through a PSTN network or the like to the processing center. In another form of the PAYMENT command, a client program in a consumer's terminal receives an account number for a merchant account from a merchant's server with the PAYMENT command. On receipt of this command, the client program suspends its operation and passes the account number to a conventional bank processing program co-resident in memory. The bank processing program establishes a standard communication link with a transaction processing system through a dedicated data line or a PSTN network. Using that communication links the bank processing program executes a commercial transaction using a standard VISA protocol or the like. The consumer may use a magnetic stripe reader and a PIN entry device to improve the security of the data transmission. The transaction center may transmit remittance data over the open network to the merchant so the merchant is apprised of payment and ships the ordered product. Once this consumer initiated transaction is complete, the bank processing program terminates and returns control to the client program which may terminate communication with the open network or retrieve information from another server on the open network for another transaction. In this way, the user may use the open network for non-confidential communication such as collecting product information, pricing, and product availability. This information may be collected quickly and efficiently using the extended Internet protocol. The conventional bank processing program and more secure communication links may then be used for the confidential information required for the transaction. Thus, the present invention is able to combine the features and advantages of the Internet with the more secure communication link and data security enhancing devices of systems presently known.

Preferably, an editor is provided which permits a user to define an application database table with data fields, define client application data fields, and define the integrated forms for communicating data between the defined database tables and a client application. The editor verifies the syntax of the user generated integrated forms containing extended Internet protocol statements and client application statements. The editor ensures that the variable names for the client application and the data fields for the database application correspond. Following the generation of the integrated form, the editor parses the integrated form to segregate the database language statements from the extended Internet protocol statements. A database language identifier is substituted in the Internet protocol statements for the database statements contained in the integrated form. The Internet protocol statements are downloaded as a file which is interpreted by the client program for the collection and submission of data from non-standard I/O devices to the database application. The database language statements segregated from the extended Internet protocol statements are placed in a second file which is named to correspond to the database table defined by the user. The CGI application recognizes the database language identifier contained in the returned forms of the Internet protocol statements. The CGI application correlates the database identifier with the file previously generated by the editor which contains the database command statements. The application then inserts the data from the returned form into the database command statements and provides the reintegrated database command statements to the database application. In this manner, the database may be queried by or retrieve data from the non-standard I/O device. In the most preferred embodiment, the editor permits a user to develop integrated forms comprised of the extended HTML language and standard query language (SQL) database application statements. In this manner, the user does not have to manually generate the SQL commands, the HTML commands, and carefully correlate the data fields of the two commands in order to implement a transaction between a client and a database.

These and other advantages and features of the present invention may be discerned from reviewing the accompanying drawings and the detailed description of the invention;

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

FIG. 2 is a diagram of the format of the FORM and INPUT tags implemented in the preferred embodiment of the present invention;

FIG. 3 is a diagram of the preferred SQL commands supported in the preferred embodiment of the present invention;

FIG. 12 is a diagram of the format for the ACTION attribute for the FORM tag performed by the common gateway interface between the Web server and an application program;

FIG. 13A is a diagram of the possible communication paths which may be used by an I/O device according to the principles of the present invention;

FIG. 13B shows an exemplary FORM tag and INPUT tag for the PAYMENT method implemented in a merchant's terminal according to the principles of the present invention;

FIG. 13C shows an exemplary FORM tag and INPUT tag for the PAYMENT method implemented in a consumer's terminal according to the principles of the present invention;

FIG. 14 shows exemplary integrated statements for a file used in the preferred embodiment of the present invention to generate the HTML files for the client program and the SQL files for the application program for a card initiated payment authorization and capture transaction, FIG. 15 shows exemplary integrated statements for a file used in the preferred embodiment of the present invention to generate the HTML files for the client program and the SQL files for the application program for a bar code reader input with card-initiated payment authorization transaction;

FIG. 16 shows exemplary integrated statements for a file used in the preferred embodiment of the present invention to generate the HTML files for the client program and the SQL files for the application program for a key input order with secure payment transaction;

FIG. 17A shows exemplary integrated statements for a file used in the preferred embodiment of the present invention to generate the HTML files for the client program and the SQL files for the application program for a smart card debit (Type 1) transaction;

FIG. 17B shows exemplary integrated statements for a file used in the preferred embodiment of the present invention to generate the HTML files for the client program and the SQL files for the application program for a smart card debit (Type 2) transaction;

FIG. 18 shows exemplary integrated statements for a file used in the preferred embodiment of the present invention to generate the HTML files for the client program and the SQL files for the application program for a debit card transaction;

FIG. 19 shows exemplary integrated statements for a file used in the preferred embodiment of the present invention to generate the HTML files for the client program and the SQL files for the application program for a check verification transaction;

FIG. 20 shows exemplary integrated statements for a file used in the preferred embodiment of the present invention to generate the HTML files for the client program and the SQL files for the application program for a customer frequency transaction;

FIG. 21 shows exemplary integrated statements for a file used in the preferred embodiment of the present invention to generate the HTML files for the client program and the SQL files for the application program for an item search transaction;

FIG. 22 shows exemplary integrated statements for a file used in the preferred embodiment of the present invention to generate the HTML files for the client program and the SQL files for tie application program for retail store end of day reporting;

FIG. 23 shows exemplary integrated statements for a file used in the preferred embodiment of the present invention to generate the HTML files for the client program and the SQL files for the application program for a store reporting an e-mail transaction;

FIG. 24A is a diagram of a manual development process for the files interpreted by the client program and the files interpreted by the application program in accordance with the principles of the present invention; and FIG. 24B is a diagram of the generation of the files interpreted by the client program and the files interpreted by application program performed by an editor constructed in accordance with the principles of the present invention.

DETAILED DESCRIPTION OF THE INVENTION

Figure 1:
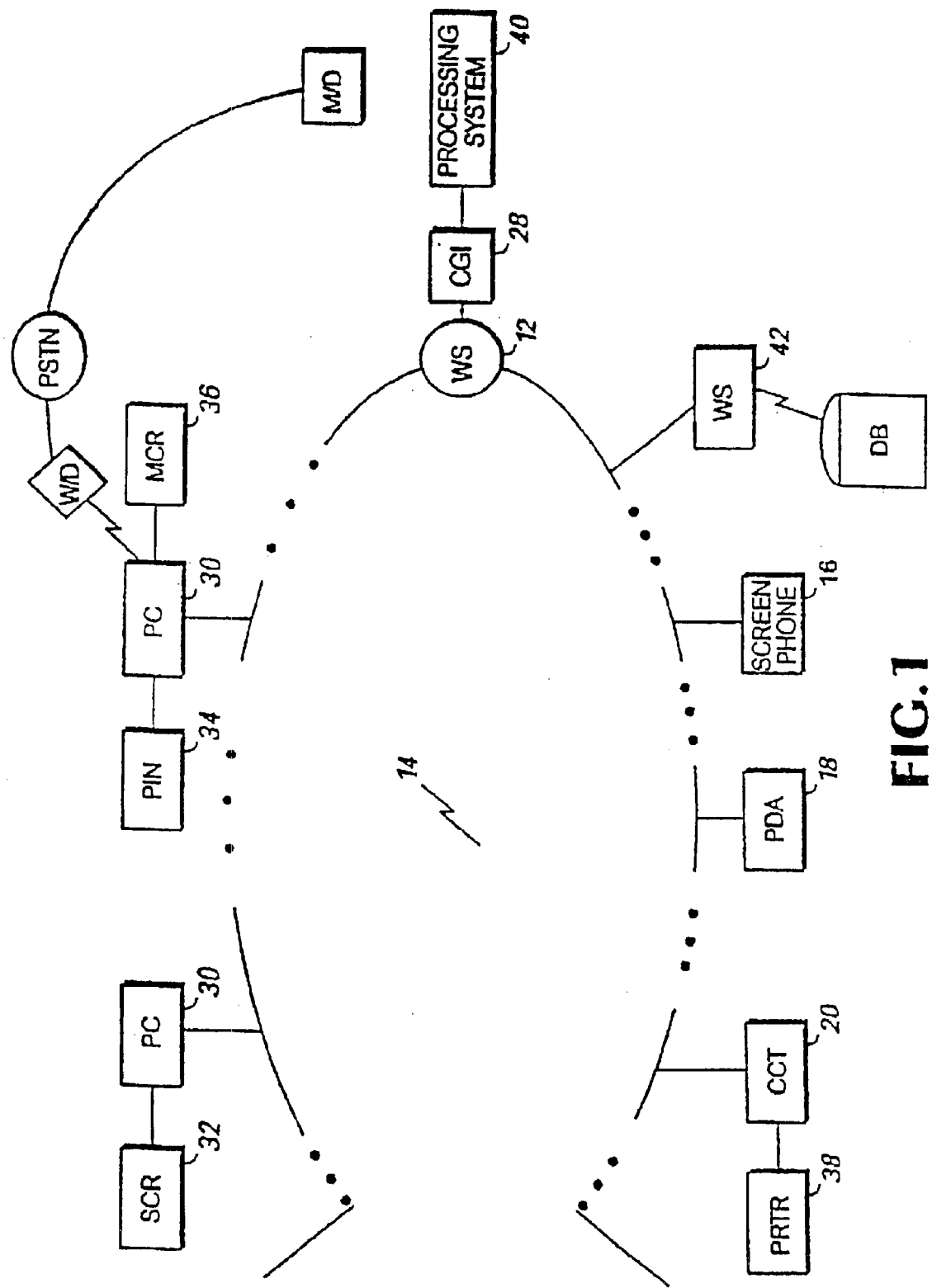
FIG. 1 is a diagram of an open network system in which the present invention is utilized.

A transaction or data system constructed in accordance with the principles of the present invention is shown is FIG. 1. The system 10 includes a Web server. 12 which is coupled to an open network 14 such as the Internet for communication with various I/O devices and terminals. For example, the I/O devices which may be coupled directly to network 14 include standard I/O devices already supported by Internet protocols such as PCs 30 and non-standard I/O devices such as a screen phone terminal 16, a personal digital assistant (PDA) 18, and a credit card terminal 20. Other exemplary non-standard I/O devices such as smart card reader 32, personal identification number PIN) pad 34, magnetic card swipe reader 36, printer 38, or the like, may be coupled to PCs through non-standard I/O ports such as COMM1 and COMM2 ports or to other non-standard I/O devices such as phone, terminal 16, PDA 18, or credit card terminal 20. Typically, these devices are coupled to PCs or devices 16, 18, or 20 through an interface such as a RS-232C interface. Merchants or other vendors may use a Web server 2 to couple to network 14 to communicate with the devices and processing system 40.

The Web server 12 is preferably coupled to a Common Gateway Interface (CGI) application 28 which converts and communicates the data and commands between the devices on network 14 and the processing system 40 so the I/O devices do not have to use the database command language to interact with the database. System 40 and the devices may communicate directly if they are implemented in the same language or if a user implements a communication interface such as CGI 28 that correlates data fields in the client with those in system 40. Server 12, CGI 28, and the applications supporting system 40 may all reside on a single host computer or they may reside on separate computers coupled together by a local area network (LAN) or a wide area network (WAN). Preferably, the application interfaces with a database which supports Open Data Base Connectivity (ODBC) and Structured Query Language (SQL).

The communication sessions between the I/O devices coupled to the open network 14 and the Web server 12 are generally conducted in the same fashion as Internet protocol communication sessions are currently performed. That is, the I/O device establishes a communication connection with Web server 12, sends a request to the Web server, the Web server responds to the request and the I/O device or server closes the connection. Preferably, the non-standard I/O devices or PCs interfaced to such devices selectively couple to a local access port on the open network 14 through a local modem/ISDN connection. In this manner, the device is only coupled to the open network 14 when a transaction or a data operation is to be performed. While connected to the open network 14, a device may access a number of servers to accomplish a purpose. For example, a device may couple to a local access port and communicate with a first server to check inventory levels at a site, communicate with a second server to order stock for the inventory, and communicate with a third server to settle payment for the ordered goods. When all aspects of the transaction are complete, the connection with the local access port is terminated. In the preferred embodiment of the present invention, the protocol used to transport data messages between Web server 12 and the I/O devices coupled to the open network 14 is the Hyper Text Transport Protocol (HTTP), although other open system protocols utilized on the Internet may be used.

In standard HTTP protocol, a client program executing in one of the I/O devices may initiate communication with a server by sending a query message of the format:

http://<host>:<port>/<path>?<search part>

The message identifies the client as seeking communication with a HTTP server at the host address on the specified port. In the HTTP protocol, the default value for the port is 80 and the host address is the Internet protocol (IP) address of the type well-known in the art. The path value selects the file in the HTTP server which is activated in response to the message and the search part specifies a query for the selected file. In the initial communication, the query may be omitted so that the selected host file responds to the client program before a query is processed.

In the present invention, the client program uses a similar message to initiate a transaction or data operation, except that database commands are preferably embedded in a file at the server 12 and not in the "search part" of the command, although search parts may be constructed in accordance with the principles of the present invention that support non-standard I/O devices. Preferably, the client program interprets Hyper Text Markup Language (HTML) files containing commands for communicating data between non-standard I/O devices and server 12. Most preferably, the HTML commands contain identifiers which are used by the CGI to place data returned in the forms of the HTML commands into database commands for queries or data insertions for the database. HTML is a command language well known for the retrieval and display of electronic documents for standard I/O devices such as PCs supported by full screen monitors, QWERTY keyboards, and standard peripherals such as hard disk drives and diskette drives. Standard HTML commands use text and previously known commands that reference Universal Resource Locators (URLs) to support the communication of electronic documents. These documents are files which may contain HTML commands, text, audio, video, or image data. The present invention extends HTML with commands that support communication between the server and the non-standard I/O devices.

In the HTTP protocol, data may be obtained during a communication session by using a tag called a FORM as part of the file defined by <path> in the command discussed above. The FORM format for standard HTTP is:

```
<FORM ACTION="URL"
    METHOD=GET|POST
>
Command
</FORM>
``` where "|" is an "OR" operator. The commands supported by standard HTTP are INPUT, SELECT, and TEXTAREA. Additionally, standard HTTP permits the inclusion of text data in the command area. In the present invention, HTML has been extended to support new ACTIONs, METHODs, and INPUTs.

In accordance with the principles of the present invention, tags are preferably used to identify device transfers and input operations. Preferably, the FORM tag is used to identify device transfers and ACTION and METHOD attributes further identify the device operation. As shown in FIG. 2, the extended ACTION field may include a FROM and TO attribute for accessing a local terminal file or smart card reader or a TO PRIER attribute for directing output data to a printer local to the I/O device. The FROM and TO attributes for accessing local files and smart card readers and for directing output data to a local printer have previously been unsupported in any Internet protocol. As a result, the server 12 may access non-standard I/O peripherals for any of the I/O devices used in the transaction or data system 10. The ACTION="URL" is a part of standard HTTP and is well known.

The METHOD attributes may include the GET, POST, PAYMENT, or SQL methods. The GET and POST methods are currently supported in standard HTTP and are well known. The PAYMENT attribute is a directive to deliver data retrieved by an INPUT command to a private payment network for authorization and settlement and is not available in current Internet protocols. This directive is used by the client program to activate a conventional financial transaction application which communicates with the transaction system over a dedicated data line or PSTN in a known protocol such as VISA. Such an attribute is used where the more secure physical connection between remote site and transaction system and data encryption devices or the like are preferred. The SQL method preferably identifies a database language file which CGI 28 uses to correlate data in the HTML FORM to an insertion or query command contained in the file.

The preferred format for the INPUT tag which is used to identify input operations is also shown in FIG. 2. The TYPE and NAME attributes are used to define a non-standard I/O device or local storage variable for the input of data. The TYPE field values "text," "password," "checkbox," "radio," "submit," and "reset" are previously known, as are the attributes NAME, VALUE, CHECKED, SIZE, and MAX-LENGTH. To support the extended capability (if the present invention, the TYPE attribute preferably includes attributes MSRT1 for reading track 1 of a magnetic swipe reader, MSRT2 for reading a magnetic swipe reader track 2, KEY for reading input from a terminal command keypad, PIN for reading a personal identification number pad, BCW for reading a bar code wand, MICR for reading a check magnetic code reader, ATM for reading a dollar amount via a key input mask, INT for reading an integer via a key input mask, database with the INSERT attribute or update data already existing in a database with the UPDATE attribute. The values for the INSERT attribute may be identified with the VALUES attribute, and the SET and WHERE attributes may be used to define and conditionally update values in the identified database. Preferably, the present invention implements two DELETE and CREATE attributes. The DELETE attribute deletes all items in an identified column of a database table which may satisfy a condition defined by a WHERE attribute. The CREATE attribute creates a database table having a primary key identified by the PRIMARY KEY attribute.

Preferably, the server program executes on a computer system having at least an Intel 80386 or better processor with at least 4 megabytes of RAM and at least 3 megabytes of hard disk space available. The computer system running the server may operate any known server platform operating system such as WINDOWS 3.1, WINDOWS 95, or WINDOWS NT, UNIX, AIX, and others. The non-standard I/O devices require a processor of a Z80A type or better, at least 32K bytes of RAM and at least 32K bytes of ROM. The device includes a modem capable of at least 1200 bits-per-second (bps) but other modem speeds may be used for communication between client and server. Alternatively, the device may be coupled to a LAN which in turn is coupled to the Internet for communication with server 12. A typical non-standard device which executes the client program is a VeriFone OMNI390, OMNI395, or VuFone terminal. OMNI390, OMNI395, and VuFone are trademarks of VeriFone, Inc., of Redwood City, Calif. Other exemplary devices include Phillips Screen phone, Hypercomm T7 terminal, and Apple Computer Newton MessagePad.

To build the preferred HTML files which CGI 28 preferably uses to implement the client program and database application, the user preferably uses an off-line editor. The files generated by the editor are preferably comprised of an integrated statements formed from HTML statements and database statements for retrieving and writing data with the database. Exemplary files showing such integrated statements for performing transactions are depicted in FIGS. 14–23B. After such a file is generated, the editor parses the integrated statements into HTML statements and into database statements such as SQL commands. The HTML files required by the client program to support communication with a transaction or data processing center may be downloaded to a device or PC for execution. The files containing the database application statements used by the CGI interface to communicate data with the database application program preferably reside on server 12. Preferably, the database files used by the CGI interface include SQL commands for the application program interfaced to an ODBC compliant database.

The general format of the HTML commands in the HTML files used for communication with a client program and server are of the general format: TAG ATTRIBUTE. Preferably, the TAG field may be one of FORM, INPUT, SQL, or TEXTAREA. The ATTRIBUTE field value depends upon the TAG value. Preferably, the FORM tag may include the ACTION or METHOD attributes where the ACTION attributes include the FROM<file>, TO PRINTER, TO<file>, and TO SCR values noted above, as well as the standard HTML ACTION value of URL=<file>. The METHOD attributes include the PAYMENT and SQL attributes noted above, as well as the standard HTML METHOD values of GET and POST. Also in accordance with the principles of the present invention, the INPUT tag may include TYPE, NAME, VALUE, CHECKED, SIZE, and MAXLENGTH attributes. These attributes are previously supported for the INPUT tag in HTML, however, the present invention further includes TYPE values of MSRT1, MSRT2, KEY, PIN, BCW, MICR, AMT, INT, LOCAL, and AUTOSUB, as well as the standard HTML TYPE values of TEXT, PASSWORD, CHECKBOX, RADIO BUTTON, SUBMIT, and RESET. The present invention also supports NAME attributes of IP_ADDRESS, HOST_PHONE, TID, WORK_KEY, DATETIME, and DEPOSIT_ACCT to identify local storage areas as well as standard HTML NAME attribute <Field_NM> to identify a FORM variable.

Figure 4:
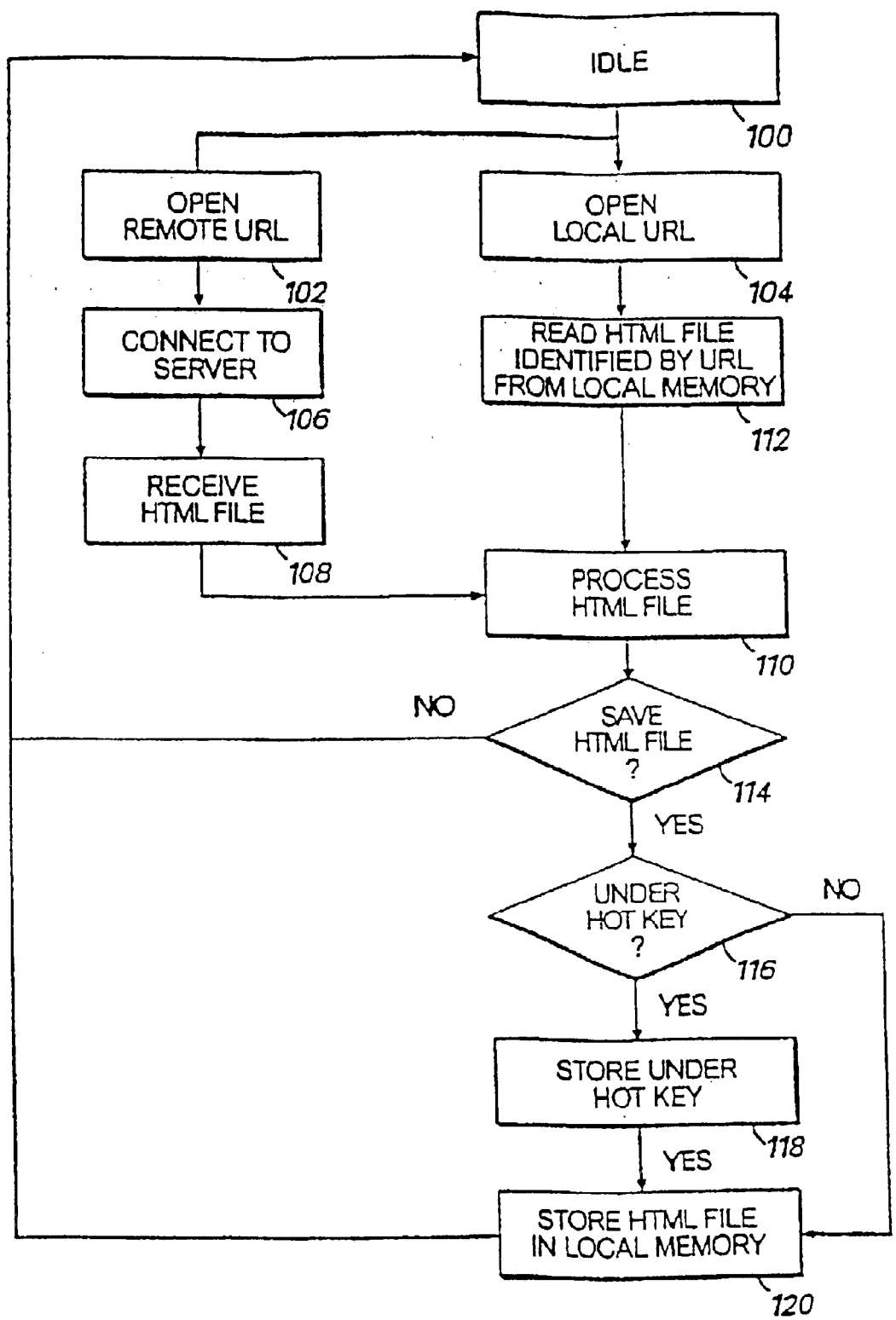
FIG. 4 is a flowchart of the high level processing of the client program which interprets the HTML files of the preferred embodiment of the present invention.

The preferred high level processing of the client program is shown in FIG. 4. That processing includes an idle step (Block 100) in which the program performs general housekeeping tasks such as maintaining internal time, scanning for input which may activate the device, or other known functions. Further processing is activated by some operator action at the device or PC which causes the device to either open a remote URL (Block 102) or open a local URL (Block 104). If a remote URL is required, the device transmits a message of the format discussed previously which is routed through the open network and delivered to a server 12 for a transaction or data processing system (Block 106). The HTML file selected at the server 12 is identified by the remote URL in the initial communication between the device and server 12 and that URL is used to return the selected HTML file to the device for processing clocks 108, 110).

FIG. 4 also shows that an operator may initiate an open local URL function by typing in a command or by pushing a hot key which is associated with a local URL. The I/O device reads the HTML file identified by the URL from local memory (Block 112) and passes the HTML file to the function for processing HTML files (Block 110). After a file is processed (Block 110), the client program determines whether the HTML file is to be stored (Block 114). If it is not, the process returns to the idle processing (Block 100). Otherwise, the process determines whether the HTML file is to be associated with a hot key (Block 116) and, if it is, it stores the file and generates the link between a hot key and the stored file (Blocks 118, 120). If the HTML file is only to be stored, no association is made with a hot key and the file is simply stored in local memory (Block 20). The client program then returns to idle processing (Block 100).

Figure 5:
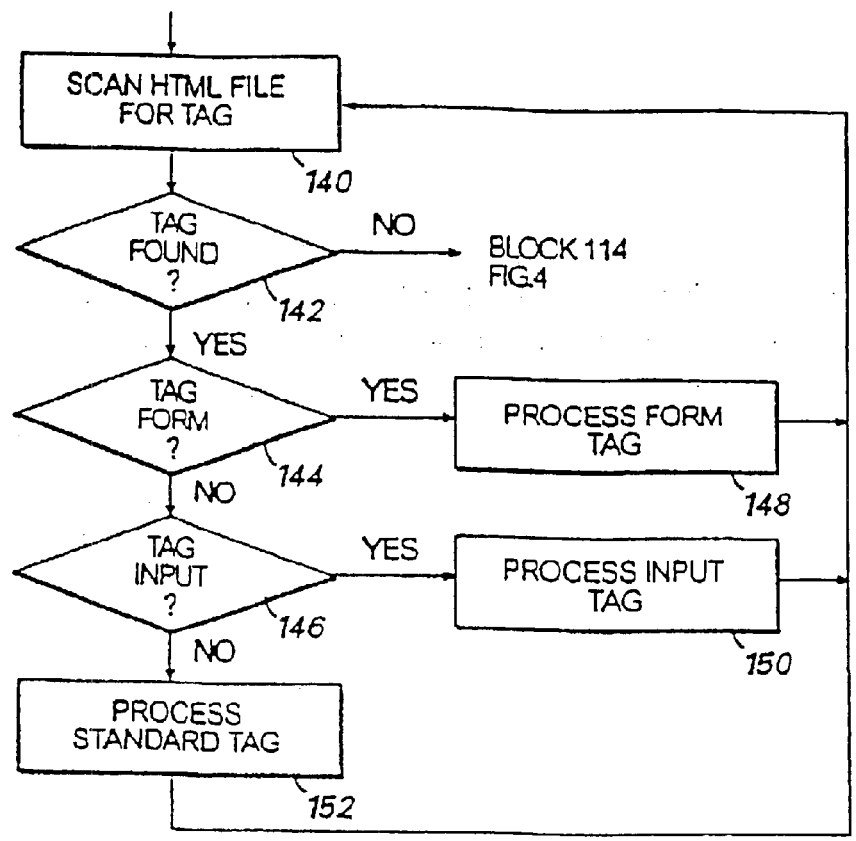
FIG. 5 is a flowchart of the HTML file processing performed by the client program of the preferred embodiment of the present invention.

The high-level processing for the HTML file (Block 110, FIG. 4) is shown in further detail in FIG. 5. The process begins by scanning the HTML file for a TAG (Block 140). If no TAG is found, the file is not in proper format for processing and processing returns to Block 114 discussed in FIG. 4 above. If a TAG is found (Block 142), the process determines whether the TAG is a FORM TAG (Block 144) or an INPUT TAG (Block 146). If it is a FORM TAG, then the FORM TAG is processed and the program continues by looking for other TAGS to process (Block 140). If the TAG is an INPUT TAG, the INPUT TAG is processed (Block 150) and the program continues by looking for other TAGS to process (Block 140). If the TAG is one of the standard HTML TAGS, the program implements the TAG in standard known ways (Block 152) and then scans for other TAGs to process (Block 140).

Figure 6:
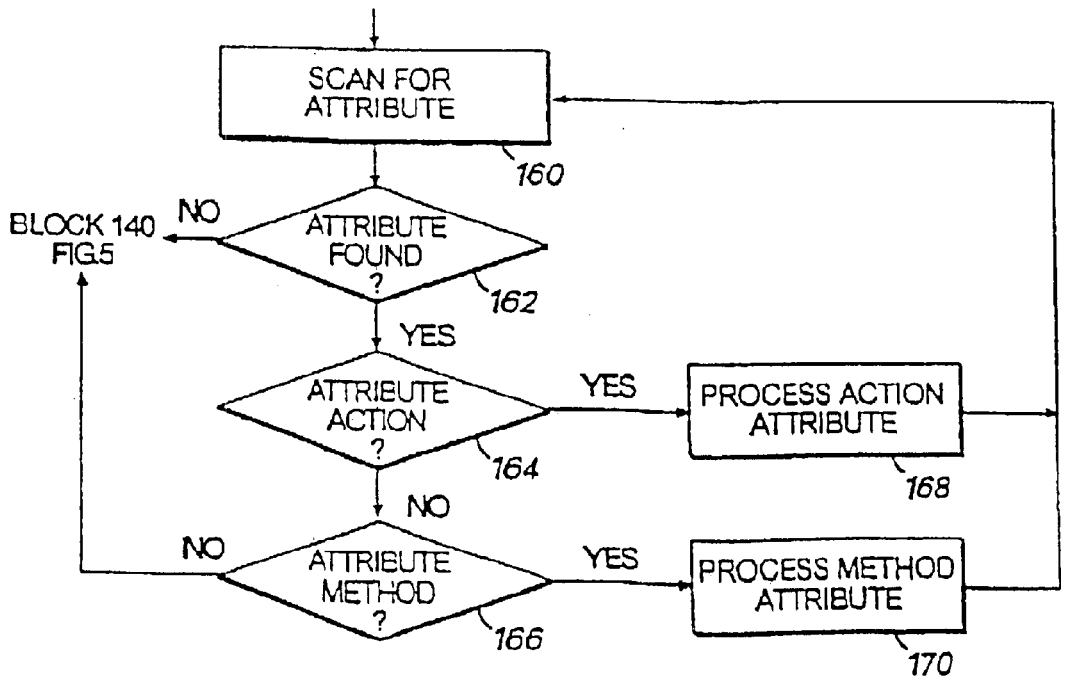
FIG. 6 is a flowchart of the attribute processing for the FORM tag performed by the client program of the preferred embodiment of the present invention.

Processing the ATTRIBUTES used to implement a FORM TAG is shown in FIG. 6. That process continues by scanning the HTML file for an attribute (Block 160). If an attribute is not found (Block 162), the program returns to scan for other TAGS (Block 140, FIG. 5). If an attribute is found, the program determines whether it is an ACTION attribute (Block 164) or a METHOD attribute (Block 166). Depending on the type of attribute, the appropriate function for processing the attribute is executed (Blocks 168 or 170) and scanning for additional attributes continues (Block 160). If the attribute is not an ACTION or METHOD attribute, there is an error in the file and processing returns to scan for other TAGs.

Figure 7:
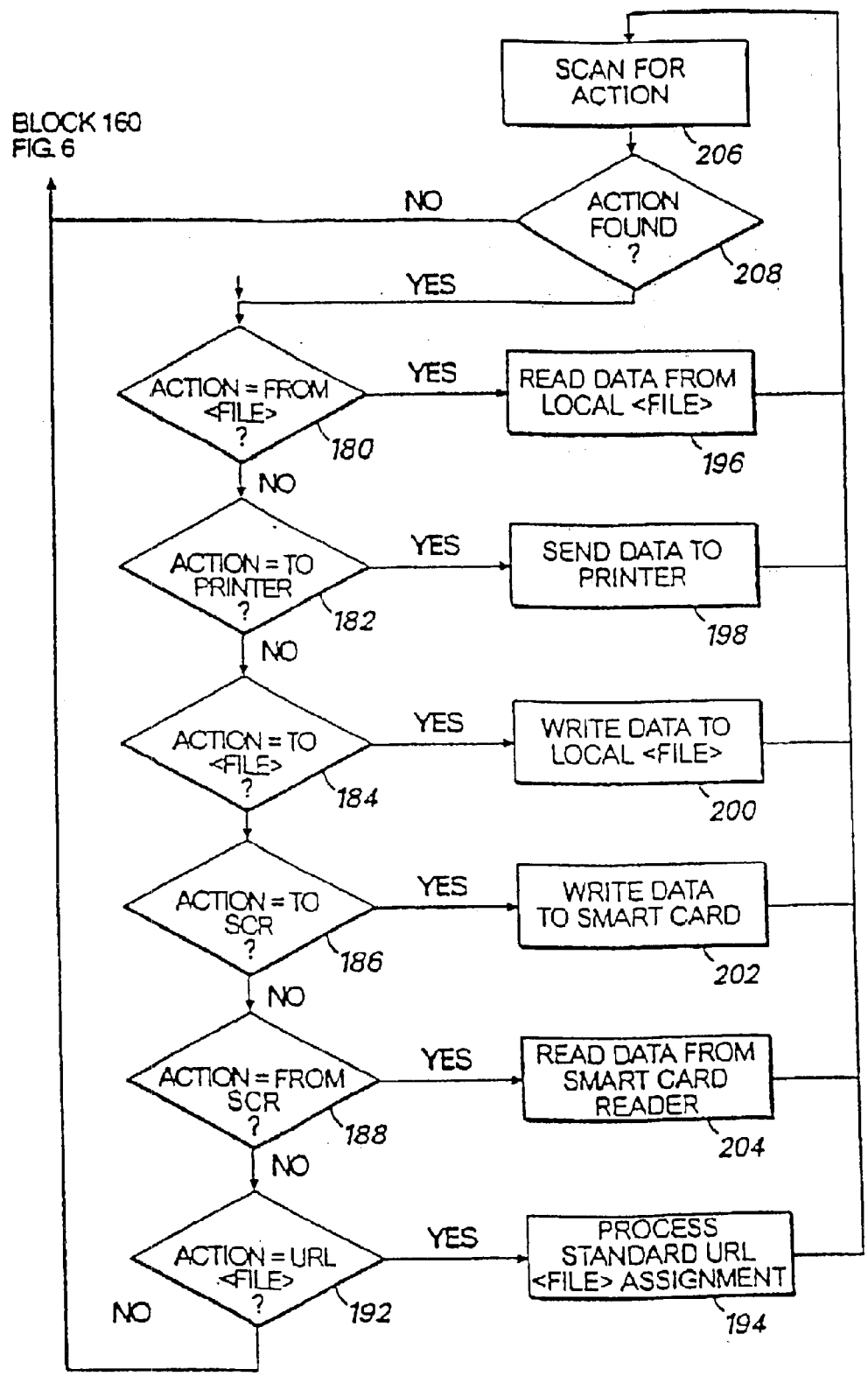
FIG. 7 is a flowchart of the processing of the ACTION attribute for the FORM tag performed by the client program of the preferred embodiment of the present invention.

The processing for the ACTION attribute is shown in FIG. 7. There, the ACTION attribute is examined to determine whether it is a FROM<file> (Block 180), TO PRINTER (Block 182), TO<file> (Block 184), TO SCR (Block 186), FROM SCR (Block 188) or a URL=<file> (Block 192). The URL=<file> ACTION is a standard HTML action which is processed in a known way (Block 194). The FROM <file> action is processed by reading data from a file associated with the I/O device or PC interfaced to the I/O device (Block 196). The TO PRINTER action results in data in the FORM being sent to the printer (Block 198) while the TO <file> action results in data in the FORM being written to a local file (Block 200). The TO SCR action causes data to be written to the smart card via a smart card reader (Block 202) and the FROM SCR reads data from a smart card through a smart card reader (Block 204). After the appropriate action processing takes place, the HTML file is scanned for additional ACTION values to perform (Block 206), and if one is found, the process continues. If no attribute is located (Block 208), the process returns to scan for other attributes (Block 160, FIG. 6).

Figure 8:
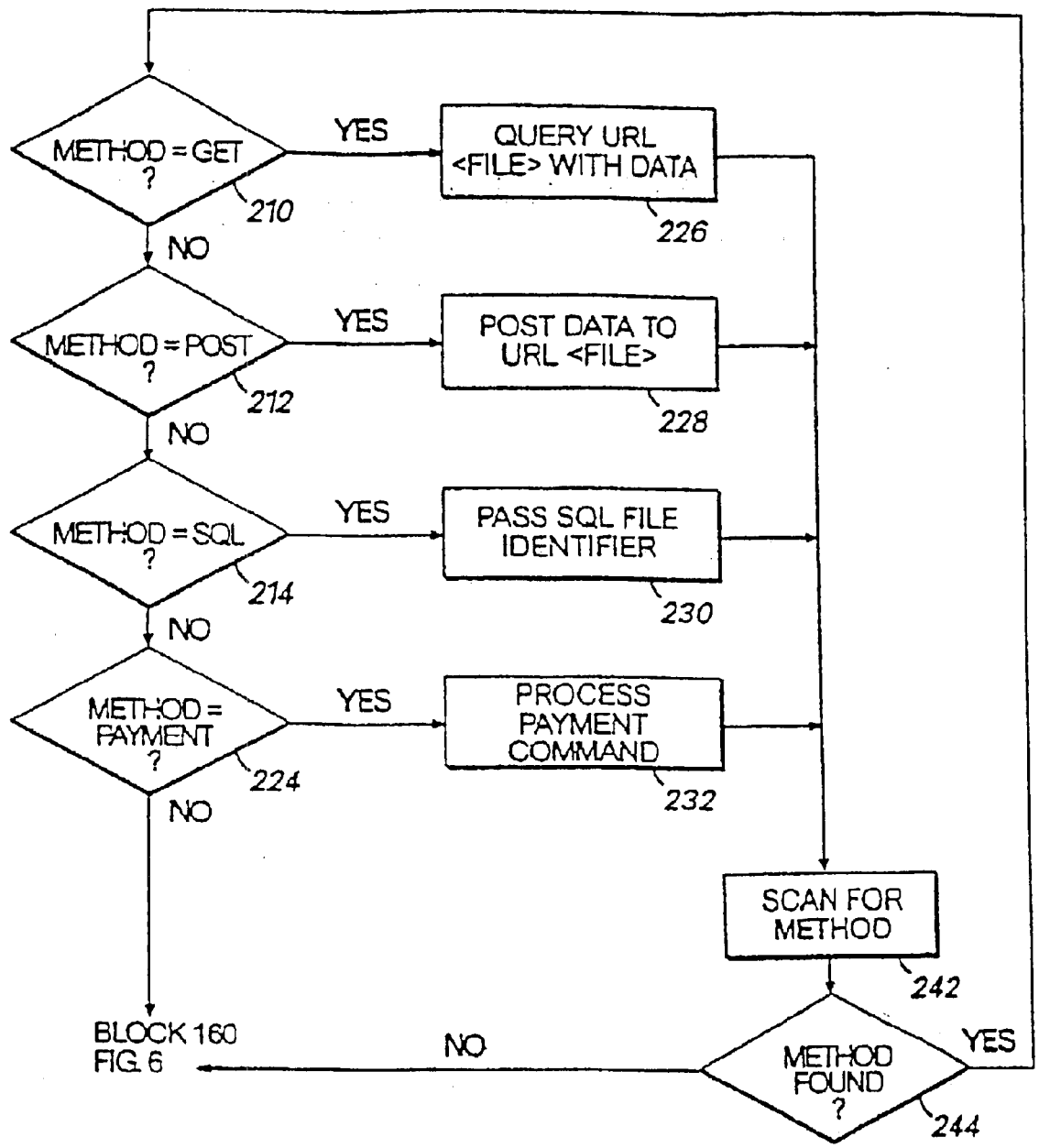
FIG. 8 is a flowchart of the processing for the METHOD attribute for the FORM tag performed by the client program of the preferred embodiment of the present invention.

The processing for the METHOD attributes for FORM tags are shown in FIG. 8. The process determines which type of METHOD is present in the FORM and then properly processes the attribute. For the GET and POST methods (Blocks 210, 212) the processing is the same as that performed in standard HTML (Blocks 226, 228). That is, for the GET method, the identified URL<file> is queried for data while the POST attribute causes data to be transferred to the URL<file>. The preferred METHOD attributes extending the HTML implementation of the present invention are SQL (Block 214), and PAYMENT (Block 224) attributes. The SQL attribute is preferably not expanded into a SQL command at the client, but rather is expanded by the CGI 28 at server 12 by correlating the data or variable field names in a returned form with the SQL commands stored at the server. This processing is done in a manner described in more detail below. The client program passes the SQL file identifier to the server 12 (Block 230). The processing of the PAYMENT command (Block 232) is discussed in more detail below. The HTML file is scanned for other METHODs (Block 242, 244), and, if one is found, the processing continues by identifying the METHOD (Blocks 210–224). Otherwise (Block 244), the process returns to scan the HTML file for other ACTION or METHOD attributes (Block 160, FIG. 6).

Figure 9:
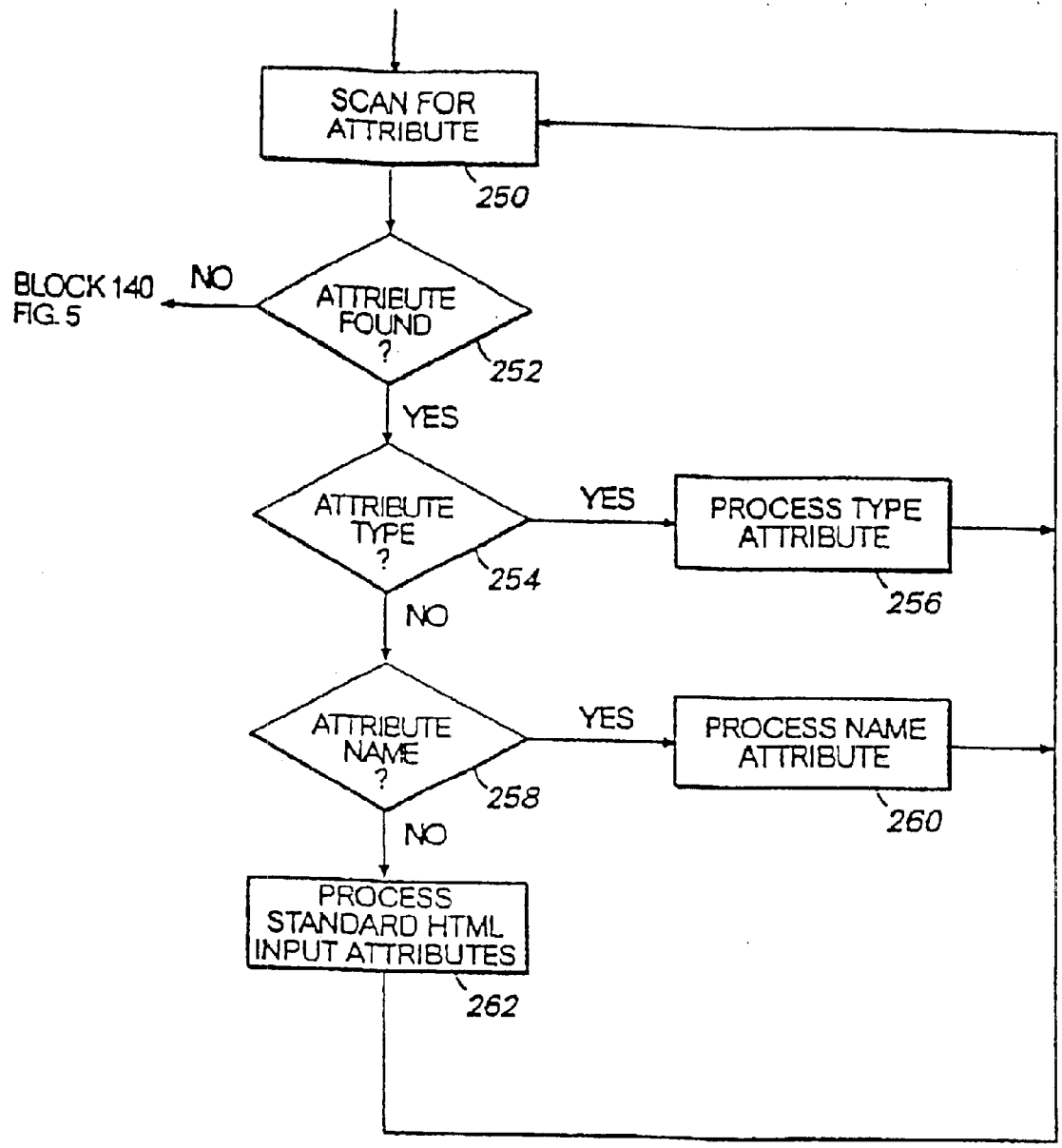
FIG. 9 is a flowchart of the attribute processing for the INPUT tag performed by the client program of the preferred embodiment of the present invention.

Processing for the INPUT tag is shown in FIG. 9. The process scans the HTML file following the INPUT tag for attributes (Block 250). If no attributes are found (Block 252), the process continues by scanning the HTML file for other tags to process (Block 140, FIG. 5). If an attribute is found and it is a TYPE attribute (Block 254), it is processed (Block 256), and if the attribute is a NAME attribute (Block 258), it is processed (Block 260). Both the TYPE and NAME processing is shown in more detail in FIGS. 10 and 11, respectively. If the attribute is neither a NAME or TYPE attribute, it is a standard attribute for an INPUT tag supported by standard HTML and is processed in a known manner (Block 262). Following processing of the INPUT attribute, the HTML file is scanned for other attributes to process (Block 250).

Figure 10:
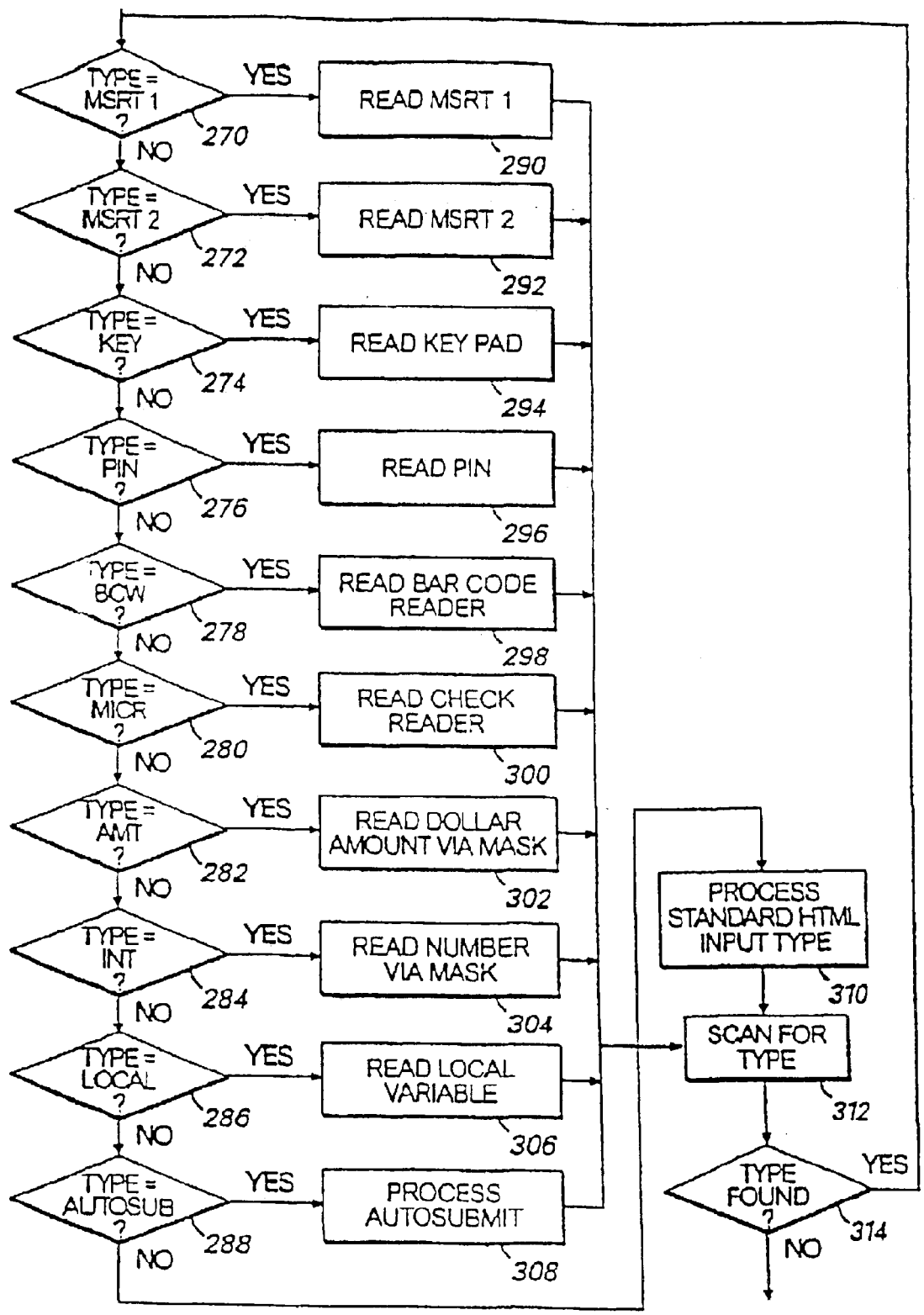
FIG. 10 is a flowchart of the processing for the TYPE attribute for the INPUT tag performed by the client program of the preferred embodiment of the present invention.

Processing for the TYPE attribute is shown in FIG. 10. The process first identifies the TYPE attribute for the INPUT tag and then performs the appropriate processing. The new TYPE attributes of the preferred embodiment of the present invention are MSRT1 (Block 270), MSRT2 (Block 272), KEY (Block 274), PIN (Block 276), BCW (Block 278), MICR (Block 280), AMT (Block 282), INT (Block 284), LOCAL (Block 286), and AUTOSUB (Block 288). If the TYPE attribute is not one of these, it is a standard HTML type attribute that is processed in a known manner (Block 310). Each of the new HTML TYPES supported by the present invention causes an I/O operation with a non-standard device. Specifically, these operations are the reading of Track 1 of the magnetic stripe reader (Block 290), the reading of the second track of the magnetic stripe reader (Block 292), the reading of a keypad (Block 294), the reading of an encrypted PIN through a PIN entry device (Block 296), the reading of a bar code through a bar code reader (Block 298), the reading of encoded data on a check through a magnetic check reader (Block 300), the reading of a dollar amount from a keypad through a key input mask (Block 302), the reading of a number from a keypad through a key input mask (Block 304), the reading of data from a local variable (Block 306) and the submission of the data read from one of these devices in a FORM returned to the server 12 (Block 308). The data mask for AMT constrains the dollar amount read to a predetermined number of characters with only two characters following the decimal point. The data mask for INT ensures the number is an integer value within a predetermined range. Processing continues by scanning the HTML file for other TYPE attributes (Block 312) and, if another TYPE attribute is found (Block 314), processing continues by determining the TYPE attribute and performing the appropriate processing. Otherwise, the process returns to scan the HTML file for other attributes (Block 250, FIG. 9).

Figure 11:
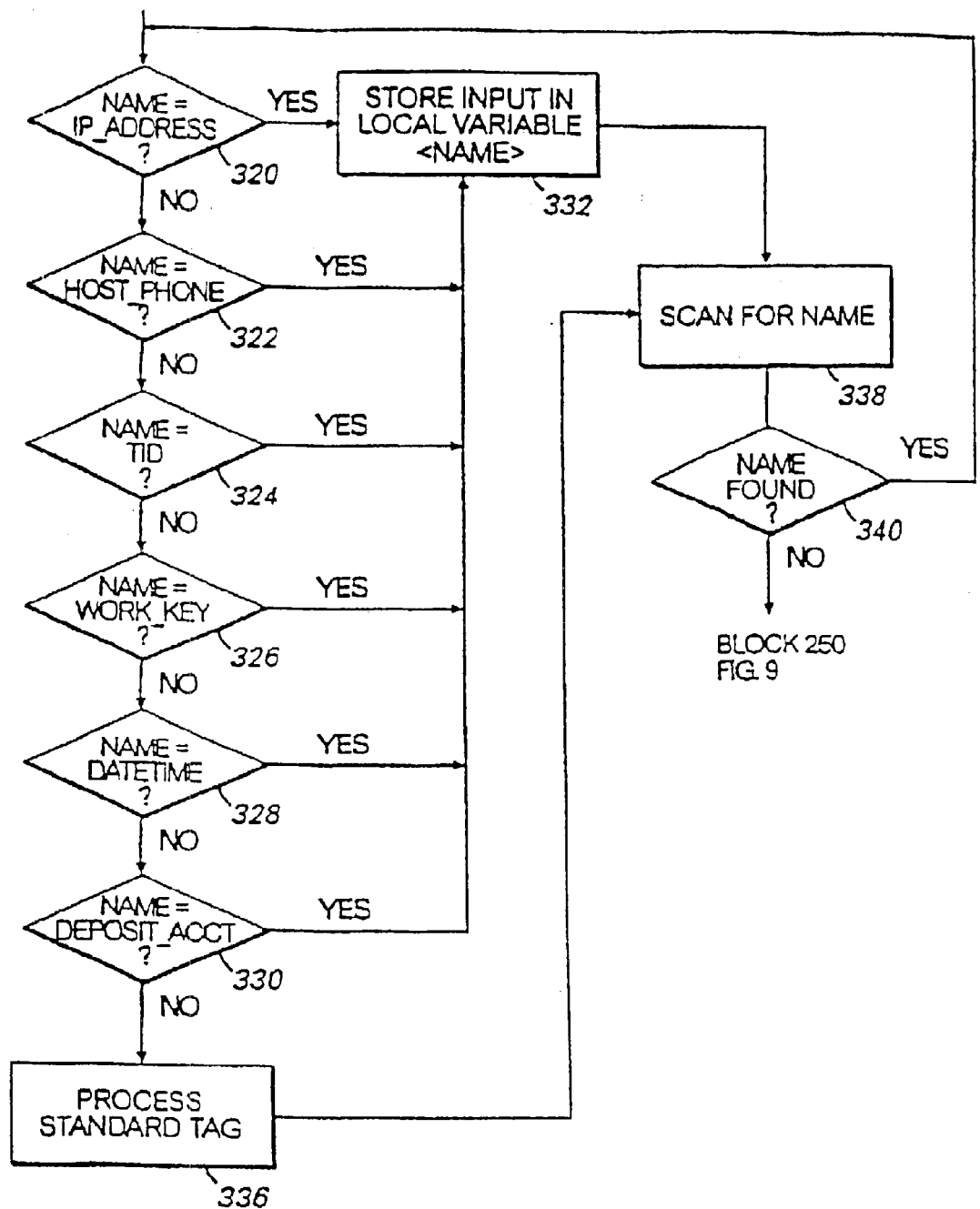
FIG. 11 is a flowchart of the processing for the NAME attribute of the INPUT tag performed by the client program of the preferred embodiment of the present invention.

The NAME attribute processing is performed in accordance with the process shown in FIG. 11. That process examines the NAME attribute to determine if the variable name identified by the attribute is IP_ADDRESS, HOST_PHONE, TID, WORK_KEY, DATETIME, or DEPOSIT_ACCT (Blocks 320, 322, 324, 326, 328, 330). If they are, the INPUT value resulting from one of the INPUTS in a FORM of the HTML file is stored in a local variable identified by the NAME attribute. Following storage (Block 332), the file is scanned for other NAME attributes (Block 328) and, if there are none (Block 332), processing continues by scanning for other attributes for the INPUT tag (Block 250, FIG. 9). If the NAME attribute is a standard HTML INPUT NAME, it is processed by known methods (Block 336). Processing then continues by scanning for other NAME attributes to process (Block 338, 340). Otherwise, the process returns to scan the HTML file for other attributes (Block 250, FIG. 9).

CGI 28 receives Internet protocol statements in a file transmitted from a client program and provides data from those statements to the application(s) implementing system 40 and receives the output of system 40 and provides them to the client program in a file. CGI 28 may be implemented by a program developed by a user using a manual development method as shown in FIG. 24A. That method requires a user to generate a system definition from which a file statement definition for the client and application are developed to implement the transactional or data system. Using the file statement definitions, the user generates the files for the client and database programs which are interpreted by the respective programs to implement transactions or data processing. This process requires the user to not only have knowledge regarding the transaction or data process but specific details of the interaction between the client and database. The user is further required to resolve and correlate all data identifiers in the statements for the client and database environments.

Preferably, CGI 28 is developed with an editor that only requires the user to define the system with statements which are an integration of the protocol statements and the database language. The process implemented by this editor is shown in FIG. 24B. Examples of such integrated statements for files which implement a specific transaction are shown in FIGS. 14 to 23B. The editor verifies the syntax of the integrated statements and correlates the data variables of the protocol statements with the data fields of the database. Following the generation of the integrated statements, the editor segregates the protocol statements from the database language statements. The protocol statements are stored in files which are identified as being for a particular transaction or data process and the database statements are stored in files which are identified as being for a particular transaction or data process on an identified database table. The editor places a database file identifier in the protocol statements which contained embedded database statements. The database file identifiers are used by CGI 28 to select the file for the appropriate transaction so CGI 28 may correlate data variables in the protocol statements with data fields in the database files. The files containing statements to be interpreted by the client program are then downloaded to the appropriate terminals, and the database files containing database language statements are stored on the system executing the CGI 23.

Alternatively, the editor of the present invention may parse integrated statements which are segregated into source code statements for first and second processors, such an editor further includes a compiler to generate executable code for each processor and, if the processors execute differing source code, a compiler for each source code language. The executable code may then be downloaded to the respective processors for execution.

More specifically, the editor preferably places the database statements for one of the transactions of the preferred embodiment in a file identified by the database name following SQL in FIG. 12. The attributes and tags forming the HTML statements for one of the transactions of the preferred embodiment are placed in a file generally denoted as <html_file>.HTM. The name <html_file> is a name which identifies one of the transactions. Where SQL statements are in the fields of the integrated statements shown in FIGS. 14 to 23B, the string "<html_file>.SQL" is substituted as the database name in the statements of the <html_file>.HTM file. When the CGI executable file is initiated and parses the returning forms, the returned data is placed in the corresponding "<html_file>.SQL" file which is passed to the application program as a command line argument. In this manner, an abbreviated form for the SQL commands may be communicated over the open network between the client and CGI and the CGI may be able to expand those abbreviated SQL commands into the appropriate SQL commands which the application program requires to manipulate the ODBC database.

To effectuate a transaction, for example, an operation at a terminal with non-standard I/O devices may activate a terminal file with a hot key or other action. In processing the activated file, the client program may acquire data which is stored in a local variable or accessible through a non-standard I/O device. This data may then be stored in a FORM and submitted to a server file at a processing system address. The server file activates CGI 28 which retrieves data from the FORM and incorporates it into database statements in the database file for the appropriate transaction and database. If the database statement is a query, the requested data is returned to the CGI in the database file and the CGI places it in the corresponding FORM variables so the server may return the data to the terminal. If the database statement provides data to a database to obtain an authorization, for example, the action performed by the database application in response to the data is placed in the corresponding FORM and returned to the terminal. In this way, data is exchanged between the terminal and the database application. This exchange is supported by CGI 28 even though the server/client communication is performed in an open system protocol, such as HTTP, and the database application is performed in another language, such as SQL. CGI 28 is able to convert and exchange the data between the client and database without the user having to specifically design and implement a conversion program.

The communication paths available for a device implementing the present invention are shown in FIG. 13A. As shown there, an I/O device 420 is coupled through the WorldWide Web open network 426 to an Internet Web server 12. This connection may be implemented with the preferred extended capability HTML described above. Although HTML files may be encrypted to enhance the security of the document as it is communicated across the Internet, the operator of the system may choose to utilize a more secure physical connection between the device 420 and the Web server 12. To obtain this alternative connection, the PAYMENT command for the METHOD attribute is preferably used. One form of the PAYMENT command is for a merchant's terminal and the other is for a consumer's terminal. In either terminal, the client program which supports the extended capability HTML operates independently but co-resident in memory with a certified bank card authorization and capture application, which may be provided by a financial institution or a bank card processor.

For the form of the command shown in FIG. 13B, the client program in the merchant terminal suspends its execution and passes the terminal identifier, stored locally, which identifies the merchant's account and the consumer account information read via a magnetic stripe reader or the like, to the bank card application. The bank card application communicates this information via a PSTN 424 or the like to a transaction processor 422. The processor 422 authorizes or denies the transaction and, if authorized, a printer at the merchant terminal prints a purchase agreement which the consumer may execute to complete the transaction.

In response to a HTML file having a FORM with an ACTION attribute equal to an executable file name for a bank card application program or the like, a METHOD attribute with a field value of PAYMENT, and an INPUT tag with a TYPE attribute of LOCAL_NAME which identifies a deposit only account supplied by a merchant (as shown in FIG. 13C), the client program is suspended and control is transferred to the bank processing application. The bank processing application then uses a modem or ISDN D channel using T3 POS protocol or the like to connect to a secure packet network 424 to connect in a via point-to-point manner with a payment processor through a PSTN network or the like. This physical connection provides an additional security element to the encrypted data for the transaction of account information, PIN numbers encrypted by PIN pads provided at the consumer site, and other sensitive information. The bank processor 422 may submit remittance data to the merchant, via the Web or otherwise. After receiving the remittance data, the merchant may ship the product to the consumer. Thus, in this manner, the I/O device may communicate with a plurality of Web servers to "shop" for a best price, delivery date, or other relevant information for selecting a preferred transaction, and then execute the PAYMENT method to utilize a more secure physical communication connection and data security devices to consummate the financial elements of the transaction with less risk and costs for the merchant, consumer, and bank processor.

The preferred integrated HTML/SQL statements which support a card initiated payment authorization and capture transaction are shown in FIG. 14. A first file 500 includes statements which identify the URL database from which the non-standard 110 device seeks authorization for a transaction. The prompts to the operator to enter the account number and amount of the transaction are supported by the INPUT tags which read the second track of the magnetic stripe reader to accept a number of up to 40 characters and assign that information from that track to a variable, and to input the up to 8 characters from the keyboard or the like into a variable called AMOUNT. The INPUT tag with the TYPE attribute of AUTOSUBMIT returns the form to the server for processing in accordance with the method defined in the returned form. As shown in FIG. 14, that METHOD statement causes CGI 28 to incorporate returned data into SQL commands which query the database as to whether the subfield of the track 2 data representing the account number is present in the authorization table of the database. If the data is not present, then a new record is inserted into a table labeled "log_table". The new record consists of the account number and the amount returned in the FORM Based upon the results of this processing, the application program supplies the data fields to the FORM which will be returned to the client program for printing the transaction record. That file 510 is shown in FIG. 14. The ACTION attribute TO PRINTER and the POST METHOD causes the data in the next eight lines to be directed to the printer coupled to the non-standard I/O device for printing the transaction form. The customer may then execute the printed form to complete the transaction. If the transaction is declined or an error is otherwise encountered, the file 520 is used to return a denial to the client program.

In a similar manner, the preferred integrated statements for a bar code order input with card-initiated payment authorization is shown in FIG. 15. The file 550, supported by the present invention which implements the transaction request, is again directed to the proper database by the ACTION attribute. The necessary customer information such as name and address may be input through a standard keyboard. The HTML command in the present invention also permits the form to receive the bar code, unit price, and credit card information in a manner similar to that discussed above for the magnetic card reader. Once this information is returned to the server and CGI interface, it is processed by the application program in accordance with the METHOD identified in the returned form. The method of HTML file 550 also creates a database order_table, having the information shown in the method. Again, if the transaction is approved, the data for the order and customer acceptance of the order is provided in HTML file 555, which is directed by the ACTION attribute to the printer at the non-standard I/O device. If the account number is not in the authorization database, the authorization declined or error response is provided in correspondence with the statements in file 560.

In a similar manner, FIGS. 16–22 show the integrated statements for a transaction request, authorization response, or authorization declined response files for key input order with secure payment transaction (FIG. 16), a smart card-debit (Type 1) transaction (FIG. 17A), a smart card debit (Type 2) transaction (FIG. 17B), a debit card transaction (FIG. 18), a check verification transaction (FIG. 19), a customer frequency transaction (FIG. 20), an item search transaction for which there is no denial (FIG. 21), retail store end of day reporting (FIG. 22) and a store reporting an e-mail transaction (FIG. 23).

While the present invention has been illustrated by the description of a preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art. For example, rather than expanding HTTP to support non-standard I/O devices, the FTP, POP, SMTP, TELNET or other protocols may be expanded in like manner to couple non-standard I/O devices to the Internet. Similarly, the preferred implementation of the present invention supports a variety of non-standard I/O devices and I/O operations. An Internet protocol may be constructed in accordance with the principles of the present invention to support only selected I/O devices or operations disclosed in the present application. The invention in its broadest aspects is therefore not limited to the specific details, preferred embodiment, and illustrative examples shown and described. Accordingly, departures may be made from such details without departing from the spirit or scope of applicant's general inventive concept.

What is claimed is:

1. An automated teller machine (ATM) for implementing financial transactions with a server over an open network comprising:

a computer having memory and a processor, the computer being coupled to an open network for communication with a server;

at least one non-standard input/output (I/O) device coupled to the computer for performing at least a portion of a financial transaction; and a computer program in the memory of the computer and executed by the processor for interpreting extended open network protocol statements received over the open network to control the at least one non-standard I/O device to which the computer is coupled.

2. The ATM of claim 1 wherein the at least one non-standard I/O device is a magnetic card reader.

3. The ATM of claim 1 wherein the at least one non-standard I/O device is a smart card reader.

4. The ATM of claim 1 wherein the at least one non-standard I/O device is a ten keypad.

5. The ATM of claim 1 wherein the at least one non-standard I/O device is a printer.

6. The ATM of claim 1 wherein the at least one non-standard I/O device is a personal identification number (PIN) pad.

7. The ATM of claim 1 wherein the computer program interprets extended Hypertext Markup Language (HTML) statements to control the at least one non-standard I/O device to which the computer is coupled.

8. The ATM of claim 1 wherein the computer program interprets extended open network protocol statements stored in an HTML document.

9. The ATM of claim 1 wherein the open network to which the computer is coupled is the Internet.

10. A transaction server for implementing financial transactions with an automated teller machine (ATM) over an open network comprising:

a server coupled to an open network for communicating with at least one non-standard input/output (I/O) device with extended open network language statements; and a database for storing data communicated with the non-standard I/O device over the open network using the extended open network language statements.

11. The transaction server of claim 10 further comprising:

a common gateway interface (CGI) coupled between the server and the database, the CGI for communicating data between the server and the database.

12. The transaction server of claim 11 wherein the CGI uses data in extended open network language statements received from a non-standard I/O device over the open network to generate database language statements for data operations with the database.

13. The transaction server of claim 11 wherein the CGI uses data retrieved from the database to generate open network language statements that are sent by the server over the open network to a non-standard I/O device.

14. A banking transaction system comprising:

a transaction server coupled to an open network;

a non-standard I/O device coupled by an automated teller machine (ATM) to the open network; and a computer program for controlling the non-standard I/O device in accordance with extended open network language statements received by the ATM from the transaction server over the open network.

15. The banking system of claim 14 wherein the computer program executes in a computer of the ATM coupled between the non-standard I/O device and the open network.

16. The banking system of claim 15 wherein the non-standard I/O device coupled to the ATM is a smart card reader.

17. The banking system of claim 15 wherein the non-standard I/O device coupled to the ATM is a magnetic stripe reader.

18. The banking system of claim 15 wherein the non-standard I/O device coupled to the ATM is a PIN pad.

19. The banking system of claim 15, the transaction server further comprising:

a database for storing data used in the extended open network language statements communicated with the non-standard I/O device coupled to the ATM.

20. The banking system of claim 19, the transaction server further comprising:

a common gateway interface (CGI) for communicating the data used in the extended open network language statements between the transaction server and the database.

* * * * *